United States Patent
Bhageshpur et al.

(10) Patent No.: US 12,443,568 B1
(45) Date of Patent: Oct. 14, 2025

(54) VERIFYING PERFORMANCE CHARACTERISTICS OF NETWORK INFRASTRUCTURE FOR FILE SYSTEMS

(71) Applicant: Qumulo, Inc., Seattle, WA (US)

(72) Inventors: Kiran V. Bhageshpur, Seattle, WA (US); Edward Addison Carpenter, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 18/945,379

(22) Filed: Nov. 12, 2024

(51) Int. Cl.
*G06F 16/182* (2019.01)
*H04L 9/40* (2022.01)

(52) U.S. Cl.
CPC .......... *G06F 16/1824* (2019.01); *H04L 63/20* (2013.01)

(58) Field of Classification Search
CPC ............................ G06F 16/1824; H04L 63/20
See application file for complete search history.

(56) References Cited

U.S. PATENT DOCUMENTS

| | | |
|---|---|---|
| 5,165,031 A | 11/1992 | Pruul et al. |
| 5,283,875 A | 2/1994 | Gibson et al. |
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |
| 6,049,809 A | 4/2000 | Raman et al. |
| 6,236,996 B1 | 5/2001 | Bapat et al. |
| 6,385,641 B1 | 5/2002 | Jiang et al. |
| 6,415,283 B1 | 7/2002 | Conklin |

(Continued)

FOREIGN PATENT DOCUMENTS

| | | | |
|---|---|---|---|
| CN | 116647491 A | * | 8/2023 |
| EP | 1217551 A2 | | 6/2002 |

(Continued)

OTHER PUBLICATIONS

Office Communication for U.S. Appl. No. 18/070,705 mailed Feb. 22, 2024, 7 Pages.

(Continued)

*Primary Examiner* — Hares Jami
(74) *Attorney, Agent, or Firm* — John W. Branch; Branch Partners PLLC

(57) ABSTRACT

Embodiments manage data in a file system over a network. A plurality of file system operations in the file system may be executed based on a file system client action or a file system administrative action such that the file system may be integrated with a network. Characteristics of the plurality network components in the network infrastructure that may be associated with the file system may be determined. Tests may be generated based on the characteristics of the network components such that the tests may be executed to evaluate the network components. Results of the tests may be employed to perform further actions, including determining non-compliant network components based on the results; modifying the network infrastructure based on the non-compliant network components such that one or more of file system operations are modified based on the non-compliant network devices; executing the modified file system operations on the modified network infrastructure.

26 Claims, 15 Drawing Sheets

(56) References Cited

U.S. PATENT DOCUMENTS

| | | |
|---|---|---|
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,072,911 B1 | 7/2006 | Doman et al. |
| 7,165,158 B1 | 1/2007 | Yagawa |
| 7,213,040 B1 | 5/2007 | Stokes et al. |
| 7,330,948 B2 | 2/2008 | Deguchi et al. |
| 7,467,333 B2 | 12/2008 | Keeton et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,761,456 B1 | 7/2010 | Cram et al. |
| 7,844,580 B2 | 11/2010 | Srivastava et al. |
| 7,933,870 B1 | 4/2011 | Webster |
| 7,937,421 B2 | 5/2011 | Mikesell et al. |
| 7,956,293 B2 | 6/2011 | Echigo et al. |
| 7,958,304 B1 | 6/2011 | Goel et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,353,044 B1 * | 1/2013 | Jones .............. H04L 63/102 718/1 |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,805,786 B1 | 8/2014 | Natanzon |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,754 B2 | 9/2014 | Craggs |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 | 5/2015 | Vaghani et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,396,202 B1 | 7/2016 | Drobychev et al. |
| 9,459,804 B1 | 10/2016 | Natanzon et al. |
| 9,501,487 B1 | 11/2016 | Yuan et al. |
| 9,519,664 B1 | 12/2016 | Kharatishvili et al. |
| 9,547,560 B1 | 1/2017 | Lee |
| 9,600,193 B2 | 3/2017 | Ahrens et al. |
| 9,613,120 B1 | 4/2017 | Kharatishvili et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 9,836,480 B2 | 12/2017 | Okun et al. |
| 9,846,698 B1 | 12/2017 | Panidis et al. |
| 10,073,856 B1 | 9/2018 | Cooper et al. |
| 10,095,708 B2 | 10/2018 | Passey et al. |
| 10,095,709 B2 | 10/2018 | Okun et al. |
| 10,095,729 B2 | 10/2018 | Taron et al. |
| 10,140,185 B1 | 11/2018 | Lopez et al. |
| 10,162,980 B1 | 12/2018 | Bernotavicius et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,318,494 B2 | 6/2019 | Krasnow et al. |
| 10,339,101 B1 | 7/2019 | Gupta |
| 10,346,355 B2 | 7/2019 | Godman |
| 10,387,810 B1 | 8/2019 | Kalush et al. |
| 10,409,784 B1 | 9/2019 | Krasnow et al. |
| 10,423,609 B1 | 9/2019 | Strauss |
| 10,437,509 B1 | 10/2019 | Alexeev et al. |
| 10,447,779 B2 | 10/2019 | Dieterich et al. |
| 10,459,884 B1 | 10/2019 | Godman |
| 10,459,892 B2 | 10/2019 | Godman et al. |
| 10,460,122 B1 | 10/2019 | Kirby et al. |
| 10,474,635 B1 | 11/2019 | Unger et al. |
| 10,534,758 B1 | 1/2020 | Carpenter et al. |
| 10,540,662 B2 | 1/2020 | Barlett et al. |
| 10,545,986 B2 | 1/2020 | Tappan et al. |
| 10,552,373 B2 | 2/2020 | Brow et al. |
| 10,606,812 B2 | 3/2020 | Cooper et al. |
| 10,614,033 B2 | 4/2020 | Rothschilds et al. |
| 10,614,241 B1 | 4/2020 | Kirby et al. |
| 10,621,057 B2 | 4/2020 | Tripathi et al. |
| 10,621,147 B1 | 4/2020 | Liang et al. |
| 10,628,391 B1 | 4/2020 | Bent et al. |
| 10,664,408 B1 | 5/2020 | Chatterjee et al. |
| 10,678,663 B1 | 6/2020 | Sharma et al. |
| 10,678,671 B2 | 6/2020 | Rothschilds et al. |
| 10,725,977 B1 | 7/2020 | Chmiel et al. |
| 10,795,796 B1 | 10/2020 | Bai et al. |
| 10,860,372 B1 | 12/2020 | Bai et al. |
| 10,860,414 B1 | 12/2020 | Urban et al. |
| 10,860,546 B2 | 12/2020 | Ye et al. |
| 10,860,547 B2 | 12/2020 | Passey et al. |
| 10,877,942 B2 | 12/2020 | Okun et al. |
| 10,936,538 B1 | 3/2021 | Unger et al. |
| 10,936,551 B1 | 3/2021 | Unger et al. |
| 11,023,535 B1 | 6/2021 | Greenwood et al. |
| 11,132,126 B1 | 9/2021 | Chmiel et al. |
| 11,132,336 B2 | 9/2021 | Passey et al. |
| 11,150,823 B2 | 10/2021 | Gao et al. |
| 11,151,001 B2 | 10/2021 | Su et al. |
| 11,151,092 B2 | 10/2021 | Chmiel et al. |
| 11,157,458 B1 | 10/2021 | Carter et al. |
| 11,249,907 B1 | 2/2022 | Brewer |
| 11,256,682 B2 | 2/2022 | Taron et al. |
| 11,265,262 B1 | 3/2022 | Makie et al. |
| 11,290,425 B2 * | 3/2022 | Newell .............. H04W 12/082 |
| 11,294,604 B1 | 4/2022 | McMullan et al. |
| 11,294,718 B2 | 4/2022 | Bai et al. |
| 11,347,699 B2 | 5/2022 | Carpenter et al. |
| 11,354,273 B1 | 6/2022 | O'Neill et al. |
| 11,360,936 B2 | 6/2022 | Haber et al. |
| 11,372,735 B2 | 6/2022 | Su et al. |
| 11,372,819 B1 | 6/2022 | Carter et al. |
| 11,435,901 B1 | 9/2022 | Chmiel et al. |
| 11,461,241 B2 | 10/2022 | Carpenter et al. |
| 11,461,286 B2 | 10/2022 | Godman et al. |
| 11,567,660 B2 | 1/2023 | Chmiel et al. |
| 11,599,508 B1 | 3/2023 | Harward et al. |
| 11,630,832 B2 | 4/2023 | Choi et al. |

(56) References Cited

U.S. PATENT DOCUMENTS

| | | |
|---|---|---|
| 11,669,255 B2 | 6/2023 | Hansen et al. |
| 11,722,150 B1 | 8/2023 | Fachan et al. |
| 11,729,269 B1 | 8/2023 | Meernik et al. |
| 11,734,147 B2 | 8/2023 | Bai et al. |
| 11,775,481 B2 | 10/2023 | Unger et al. |
| 11,921,677 B1 | 3/2024 | Kirby et al. |
| 11,934,660 B1 | 3/2024 | McMullan et al. |
| 11,966,592 B1 | 4/2024 | Bai |
| 12,019,875 B1 | 6/2024 | McMullan et al. |
| 12,038,877 B1 | 7/2024 | Kirby et al. |
| 12,222,903 B1 | 2/2025 | Rothschilds et al. |
| 12,292,853 B1 | 5/2025 | Ellis et al. |
| 2001/0039622 A1 | 11/2001 | Hitz et al. |
| 2002/0059439 A1 | 5/2002 | Arroyo et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114593 A1 | 5/2005 | Cassell et al. |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0182992 A1 | 8/2005 | Land et al. |
| 2005/0187992 A1 | 8/2005 | Prahlad et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0005297 A1 | 1/2007 | Beresniewicz et al. |
| 2007/0011302 A1 | 1/2007 | Groner et al. |
| 2007/0027985 A1 | 2/2007 | Ramany et al. |
| 2007/0061783 A1 | 3/2007 | Prakash |
| 2007/0100855 A1 | 5/2007 | T. Kohl |
| 2007/0106706 A1 | 5/2007 | Ahrens et al. |
| 2007/0118561 A1 | 5/2007 | Idicula et al. |
| 2007/0143371 A1 | 6/2007 | Kottomtharayil et al. |
| 2008/0028006 A1 | 1/2008 | Liu et al. |
| 2008/0059399 A1 | 3/2008 | Delorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0004914 A1* | 1/2011 | Ennis, Jr. ............... H04L 41/22 726/1 |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0153560 A1 | 6/2011 | Bryant et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2011/0302357 A1 | 12/2011 | Sullivan |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0116478 A1 | 5/2012 | Buhlmann et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0031232 A1 | 1/2013 | Clymer et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0103778 A1 | 4/2013 | Hayashi et al. |
| 2013/0110787 A1 | 5/2013 | Garimella et al. |
| 2013/0145471 A1 | 6/2013 | Richard et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0268650 A1 | 10/2013 | Faitelson et al. |
| 2013/0275391 A1 | 10/2013 | Batwara et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkison et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1 | 3/2014 | Lovinger et al. |
| 2014/0089649 A1 | 3/2014 | Chaganti |
| 2014/0095249 A1 | 4/2014 | Tarakad et al. |
| 2014/0095505 A1 | 4/2014 | Blanchflower et al. |
| 2014/0095560 A1 | 4/2014 | Ikai et al. |
| 2014/0095582 A1 | 4/2014 | Eshel et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189257 A1 | 7/2014 | Aritome |
| 2014/0189267 A1 | 7/2014 | Qi et al. |
| 2014/0195847 A1 | 7/2014 | Webman et al. |
| 2014/0237193 A1 | 8/2014 | Shivashankaraiah |
| 2014/0258609 A1 | 9/2014 | Cui et al. |
| 2014/0258657 A1 | 9/2014 | Schott et al. |
| 2014/0280485 A1 | 9/2014 | A Hummaida et al. |
| 2014/0280889 A1 | 9/2014 | Nispel et al. |

(56) References Cited

U.S. PATENT DOCUMENTS

| | | |
|---|---|---|
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0358356 A1 | 12/2014 | Jones et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012656 A1 | 1/2015 | Phillips et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186410 A1 | 7/2015 | Petculescu et al. |
| 2015/0186483 A1 | 7/2015 | Tappan et al. |
| 2015/0186527 A1 | 7/2015 | Rao et al. |
| 2015/0186529 A1 | 7/2015 | Rope et al. |
| 2015/0193317 A1* | 7/2015 | Firley ............... H04L 45/02 714/4.11 |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0269203 A1 | 9/2015 | Baldwin et al. |
| 2015/0278282 A1 | 10/2015 | Sardina et al. |
| 2015/0278329 A1 | 10/2015 | Hrle et al. |
| 2015/0310034 A1 | 10/2015 | Godman et al. |
| 2015/0310035 A1 | 10/2015 | Godman et al. |
| 2015/0310054 A1 | 10/2015 | Passey et al. |
| 2015/0347126 A1 | 12/2015 | Tibble et al. |
| 2016/0034356 A1 | 2/2016 | Aron et al. |
| 2016/0034481 A1 | 2/2016 | Kumarasamy et al. |
| 2016/0071233 A1 | 3/2016 | Macko et al. |
| 2016/0110105 A1 | 4/2016 | Karamcheti et al. |
| 2016/0139836 A1 | 5/2016 | Nallathambi et al. |
| 2016/0139952 A1 | 5/2016 | Geng et al. |
| 2016/0147654 A1 | 5/2016 | Zhao et al. |
| 2016/0164916 A1 | 6/2016 | Satish et al. |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0350363 A1 | 12/2016 | Raja et al. |
| 2016/0357677 A1 | 12/2016 | Hooker et al. |
| 2016/0359859 A1 | 12/2016 | Capone |
| 2016/0371296 A1 | 12/2016 | Passey et al. |
| 2016/0371297 A1 | 12/2016 | Okun et al. |
| 2016/0380878 A1 | 12/2016 | Bugenhagen et al. |
| 2016/0380913 A1 | 12/2016 | Morgan et al. |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0165300 A1 | 6/2018 | Okun et al. |
| 2018/0165321 A1 | 6/2018 | Taron et al. |
| 2018/0176082 A1 | 6/2018 | Katz et al. |
| 2018/0176120 A1 | 6/2018 | Katz et al. |
| 2018/0181583 A1 | 6/2018 | Godman |
| 2018/0203798 A1 | 7/2018 | Hughes et al. |
| 2018/0232386 A1 | 8/2018 | Brow et al. |
| 2018/0276078 A1 | 9/2018 | Blea et al. |
| 2018/0288057 A1 | 10/2018 | Varadamma et al. |
| 2018/0307579 A1 | 10/2018 | Rothchilds et al. |
| 2018/0314423 A1 | 11/2018 | Gong et al. |
| 2018/0357291 A1 | 12/2018 | Choi et al. |
| 2018/0365115 A1 | 12/2018 | Fang et al. |
| 2019/0087770 A1 | 3/2019 | Walsh et al. |
| 2019/0095112 A1 | 3/2019 | Lingarajappa |
| 2019/0102700 A1 | 4/2019 | Babu et al. |
| 2019/0163589 A1 | 5/2019 | Mcbride et al. |
| 2019/0163591 A1 | 5/2019 | Ouyang et al. |
| 2019/0196879 A1 | 6/2019 | Dutta et al. |
| 2019/0212921 A1 | 7/2019 | Liang et al. |
| 2019/0220189 A1 | 7/2019 | Yang et al. |
| 2019/0243818 A1 | 8/2019 | Taron et al. |
| 2019/0251065 A1 | 8/2019 | Passey et al. |
| 2019/0251066 A1 | 8/2019 | Okun et al. |
| 2019/0286521 A1 | 9/2019 | Okpotse et al. |
| 2019/0286528 A1 | 9/2019 | Wu et al. |
| 2019/0286543 A1 | 9/2019 | Rothschilds et al. |
| 2019/0294591 A1 | 9/2019 | Krasnow et al. |
| 2019/0332576 A1 | 10/2019 | Godman |
| 2019/0332579 A1 | 10/2019 | Cooper et al. |
| 2019/0377802 A1 | 12/2019 | Haber et al. |
| 2019/0384640 A1 | 12/2019 | Swamy et al. |
| 2020/0004977 A1 | 1/2020 | Araujo et al. |
| 2020/0026438 A1 | 1/2020 | Peleg et al. |
| 2020/0034077 A1 | 1/2020 | Haravu et al. |
| 2020/0050391 A1 | 2/2020 | Meyerowitz et al. |
| 2020/0142878 A1 | 5/2020 | Varadarajan et al. |
| 2020/0174692 A1 | 6/2020 | Dave et al. |
| 2020/0201824 A1 | 6/2020 | Nishimoto et al. |
| 2020/0210385 A1 | 7/2020 | Carpenter et al. |
| 2020/0242075 A1 | 7/2020 | Davis et al. |
| 2020/0242082 A1 | 7/2020 | Chmiel et al. |
| 2020/0286270 A1 | 9/2020 | Lymperopoulos et al. |
| 2020/0341689 A1 | 10/2020 | Smith |
| 2020/0387315 A1 | 12/2020 | Sterns et al. |
| 2020/0409583 A1 | 12/2020 | Kusters et al. |
| 2021/0004355 A1 | 1/2021 | Iwase |
| 2021/0042263 A1 | 2/2021 | Zdornov et al. |
| 2021/0042282 A1 | 2/2021 | Cseri et al. |
| 2021/0056074 A1 | 2/2021 | Zhu |
| 2021/0110150 A1 | 4/2021 | Kakrana et al. |
| 2021/0117868 A1 | 4/2021 | Sriharsha |
| 2021/0132824 A1 | 5/2021 | Furuta et al. |
| 2021/0173588 A1 | 6/2021 | Kannan et al. |
| 2021/0191650 A1 | 6/2021 | Vansteenkiste et al. |
| 2021/0232427 A1 | 7/2021 | Bai et al. |
| 2021/0232464 A1 | 7/2021 | Su et al. |
| 2021/0232481 A1 | 7/2021 | Bai et al. |
| 2021/0240393 A1 | 8/2021 | Jo et al. |
| 2021/0240678 A1 | 8/2021 | Patel et al. |
| 2021/0279187 A1 | 9/2021 | Puder et al. |
| 2021/0311841 A1 | 10/2021 | McNutt |
| 2021/0374105 A1 | 12/2021 | Kodama et al. |
| 2022/0019361 A1 | 1/2022 | Kurata et al. |
| 2022/0035716 A1 | 2/2022 | Su et al. |
| 2022/0035831 A1 | 2/2022 | Beers |
| 2022/0058055 A1 | 2/2022 | Amemiya et al. |
| 2022/0066882 A1 | 3/2022 | Wang et al. |
| 2022/0091739 A1 | 3/2022 | Kumar et al. |
| 2022/0100705 A1 | 3/2022 | Unger et al. |

(56) References Cited

U.S. PATENT DOCUMENTS

| | | | |
|---|---|---|---|
| 2022/0107729 A1 | 4/2022 | Hua | |
| 2022/0124152 A1 | 4/2022 | Gallego et al. | |
| 2022/0138150 A1 | 5/2022 | Chmiel et al. | |
| 2022/0283956 A1 | 9/2022 | Carpenter et al. | |
| 2022/0300155 A1 | 9/2022 | Chmiel et al. | |
| 2022/0300159 A1 | 9/2022 | Chmiel et al. | |
| 2023/0004312 A1 | 1/2023 | Hansen et al. | |
| 2023/0057068 A1 | 2/2023 | Bhandarkar et al. | |
| 2023/0057600 A1 | 2/2023 | Malley et al. | |
| 2023/0069434 A1* | 3/2023 | Cheng | H04L 41/16 |
| 2023/0106208 A1 | 4/2023 | Nossenson et al. | |
| 2023/0342053 A1 | 10/2023 | Varghese et al. | |
| 2024/0020268 A1 | 1/2024 | Haber et al. | |
| 2024/0028596 A1 | 1/2024 | Lakshman et al. | |
| 2025/0147924 A1 | 5/2025 | Ellis et al. | |

FOREIGN PATENT DOCUMENTS

| | | |
|---|---|---|
| EP | 1498829 A1 | 1/2005 |
| EP | 3311312 A1 | 12/2016 |
| EP | 3333732 A1 | 6/2018 |
| EP | 3361397 A1 | 8/2018 |
| EP | 3361397 B1 | 11/2020 |
| EP | 3333732 B1 | 3/2023 |
| WO | 99/44145 A1 | 9/1999 |
| WO | 00/72201 A1 | 11/2000 |
| WO | 2009/007250 A2 | 1/2009 |
| WO | 2012/029259 A1 | 3/2012 |
| WO | 2016/205752 A1 | 12/2016 |
| WO | 2021/151107 A1 | 7/2021 |
| WO | 2021/189055 A2 | 9/2021 |
| WO | 2025/101416 A1 | 5/2025 |
| WO | 2025/101465 A1 | 5/2025 |

OTHER PUBLICATIONS

Office Communication for U.S. Appl. No. 18/070,705 mailed Mar. 5, 2024, 2 Pages.
Office Communication for U.S. Appl. No. 17/115,529 mailed Mar. 26, 2024, 27 Pages.
Office Communication for U.S. Appl. No. 18/583,746 mailed May 14, 2024, 21 Pages.
Office Communication for U.S. Appl. No. 18/590,088 mailed Apr. 24, 2024, 18 Pages.
Office Communication for U.S. Appl. No. 18/590,088 mailed May 2, 2024, 13 Pages.
Office Communication for U.S. Appl. No. 17/864,190 mailed Jun. 4, 2024, 12 Pages.
Marcus Jurgens, "Aggregated Data in Tree-Based Index Structures" in Index Structures for Data Warehouses, LNCS 1859, Springer, Year: 2002, pp. 43-62.
Office Communication for U.S. Appl. No. 18/503,082 mailed Feb. 29, 2024, 26 Pages.
Office Communication for U.S. Appl. No. 18/503,082 mailed May 15, 2024, 27 Pages.
Office Communication for U.S. Appl. No. 18/503,082 mailed Jun. 25, 2024, 4 Pages.
Office Communication for U.S. Appl. No. 18/503,082 mailed Sep. 6, 2024, 27 Pages.
Office Communication for U.S. Appl. No. 18/799,431 mailed Oct. 23, 2024, 30 Pages.
Office Communication for U.S. Appl. No. 18/799,431 mailed Nov. 6, 2024, 27 Pages.
International Search Report and Written Opinion for International Patent Application No. PCT/US2021/023531 mailed Jul. 6, 2021, 6 Pages.
Office Communication for U.S. Appl. No. 17/062,500 mailed Jul. 12, 2021, 18 Pages.
Office Communication for U.S. Appl. No. 16/775,041 mailed Jul. 21, 2021, 11 Pages.
Office Communication for U.S. Appl. No. 17/114,384 mailed Aug. 3, 2021, 4 Pages.
Office Communication for U.S. Appl. No. 14/595,598 mailed Aug. 6, 2021, 20 Pages.
Office Communication for U.S. Appl. No. 17/115,529 mailed Aug. 12, 2021, 4 Pages.
Office Communication for U.S. Appl. No. 17/190,653 mailed Aug. 27, 2021, 11 Pages.
Office Communication for U.S. Appl. No. 17/114,384 mailed Sep. 2, 2021, 5 Pages.
Office Communication for U.S. Appl. No. 16/152,277 mailed Sep. 3, 2021, 4 Pages.
Office Communication for U.S. Appl. No. 16/004,182 mailed Sep. 10, 2021, 4 Pages.
Office Communication for U.S. Appl. No. 16/004,182 mailed Sep. 29, 2021, 11 Pages.
Office Communication for U.S. Appl. No. 17/491,017 mailed Dec. 23, 2021, 41 Pages.
Office Communication for U.S. Appl. No. 17/491,017 mailed May 12, 2022, 50 Pages.
Office Communication for U.S. Appl. No. 17/491,017 mailed Sep. 15, 2022, 55 Pages.
Office Communication for U.S. Appl. No. 17/491,017 mailed Feb. 10, 2023, 55 Pages.
Office Communication for U.S. Appl. No. 17/491,017 mailed Aug. 8, 2023, 13 Pages.
Office Communication for U.S. Appl. No. 14/595,598 mailed May 16, 2019, 18 Pages.
Office Communication for U.S. Appl. No. 16/152,277 mailed Oct. 26, 2021, 2 Pages.
Office Communication for U.S. Appl. No. 16/004,182 mailed Mar. 17, 2022, 3 Pages.
Office Communication for U.S. Appl. No. 16/226,587 mailed Jan. 27, 2020, 13 Pages.
Office Communication for U.S. Appl. No. 16/741,567 mailed Feb. 24, 2022, 2 Pages.
Office Communication for U.S. Appl. No. 16/234,334 mailed Oct. 11, 2019, 16 Pages.
Office Communication for U.S. Appl. No. 16/262,790 mailed Nov. 8, 2019, 5 Pages.
Office Communication for U.S. Appl. No. 17/504,289 mailed Apr. 20, 2022, 2 Pages.
Office Communication for U.S. Appl. No. 16/659,488 mailed May 6, 2020, 8 Pages.
International Preliminary Report on Patentability Chapter I for International Patent Application No. PCT/US2021/023531 mailed Aug. 4, 2022, 5 Pages.
International Preliminary Report on Patentability Chapter I for International Patent Application No. PCT/US2021/023525 mailed Aug. 4, 2022, 5 Pages.
International Preliminary Report on Patentability Chapter I for International Patent Application No. PCT/US2016/038242 mailed Dec. 28, 2017, 8 Pages.
Office Action for European Patent Application No. 17206518.7 mailed Mar. 15, 2022, 5 Pages.
Intention to Grant for European Patent Application No. 17206518.7 mailed Sep. 30, 2022, 6 Pages.
Office Communication for U.S. Appl. No. 17/508,869 mailed Mar. 8, 2022, 2 Pages.
Office Communication for U.S. Appl. No. 17/508,869 mailed Jan. 5, 2022, 3 Pages.
Office Communication for U.S. Appl. No. 17/508,869 mailed Dec. 22, 2021, 9 Pages.
Office Communication for U.S. Appl. No. 17/530,420 mailed May 4, 2022, 3 Pages.
Office Communication for U.S. Appl. No. 17/530,420 mailed May 12, 2022, 3 Pages.
Office Communication for European Patent Application No. 16812585.4 mailed Apr. 1, 2021, 9 pages.
Intention to Grant for European Patent Application No. 18155779.4 mailed Jun. 12, 2020, 10 Pages.
Office Communication for U.S. Appl. No. 17/115,529 mailed Sep. 12, 2023, 25 Pages.

(56) References Cited

OTHER PUBLICATIONS

Office Communication for U.S. Appl. No. 17/491,017 mailed May 4, 2023, 6 Pages.
Office Communication for U.S. Appl. No. 17/491,017 mailed Aug. 17, 2022, 5 Pages.
Office Communication for U.S Patent Application No. 17/864,190 mailed Aug. 25, 2023, 12 Pages.
Office Communication for U.S. Appl. No. 18/070,705 mailed Sep. 7, 2023, 5 Pages.
Office Communication for European Patent Application No. 18155779.4 mailed Apr. 17, 2018, 4 Pages.
Office Communication for U.S Patent Application No. 17/864, 190 mailed Nov. 17, 2023, 12 Pages.
Office Communication for U.S. Appl. No. 17/115,529 mailed Dec. 13, 2023, 4 Pages.
Office Communication for U.S. Appl. No. 17/115,529 mailed Jan. 12, 2024, 26 Pages.
Office Communication for U.S. Appl. No. 18/503,791 mailed Jan. 4, 2024, 27 Pages.
Office Communication for U.S. Appl. No. 17/864,190 mailed Feb. 8, 2024, 5 Pages.
Office Communication for U.S. Appl. No. 18/503,918 mailed Jan. 24, 2024, 12 Pages.
Office Communication for U.S. Appl. No. 18/503,918 mailed Jan. 31, 2024, 8 Pages.
Office Communication for U.S. Appl. No. 16/883,922 mailed Aug. 7, 2020, 13 Pages.
Office Communication for U.S. Appl. No. 16/775,041 mailed Aug. 18, 2020, 9 Pages.
Office Communication for U.S. Appl. No. 16/883,879 mailed Sep. 1, 2020, 11 Pages.
Extended European Search Report for European Patent Application No. 16812585.4 mailed Nov. 7, 2018, 9 Pages.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Office Communication for European Patent Application No. 16812585.4 mailed Jan. 2, 2020, 6 Pages.
International Search Report and Written Opinion for International Patent Application No. PCT/US2016/038242 mailed Oct. 11, 2016, 9 Pages.
Office Communication for U.S. Appl. No. 14/595,598 mailed Jul. 31, 2019, 5 Pages.
Office Communication for U.S. Appl. No. 14/595,598 mailed Sep. 20, 2018, 18 Pages.
Office Communication for U.S. Appl. No. 14/595,598 mailed Dec. 15, 2017, 18 Pages.
Office Communication for U.S. Appl. No. 14/595,598 mailed Feb. 24, 2017, 8 Pages.
Office Communication for U.S. Appl. No. 14/595,598 mailed Apr. 19, 2018, 5 Pages.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 mailed Aug. 24, 2020, 7 Pages.
Office Communication for European Patent Application No. 18155779.4 mailed Oct. 8, 2019, 4 Pages.
Office Communication for U.S. Appl. No. 16/152,259 mailed Aug. 28, 2020, 5 Pages.
Office Communication for U.S. Appl. No. 16/752,509 mailed Aug. 11, 2020, 7 Pages.
Office Communication for U.S. Appl. No. 14/595,598 mailed Sep. 25, 2020, 7 Pages.
Office Communication for U.S. Appl. No. 16/152,277 mailed Oct. 16, 2020, 10 Pages.
Office Communication for U.S. Appl. No. 16/152,615 mailed Oct. 20, 2020, 7 Pages.
Office Communication for U.S. Appl. No. 16/775,041 mailed Nov. 3, 2020, 5 Pages.
Office Communication for U.S. Appl. No. 17/062,500 mailed Nov. 12, 2020, 12 Pages.
Office Communication for U.S. Appl. No. 16/004,182 mailed Nov. 30, 2020, 55 Pages.
Office Communication for U.S. Appl. No. 14/859,114 mailed Dec. 1, 2020, 24 Pages.
Office Communication for U.S. Appl. No. 16/883,922 mailed Dec. 2, 2020, 9 Pages.
Office Communication for U.S. Appl. No. 16/883,879 mailed Dec. 8, 2020, 5 Pages.
Office Communication for U.S. Appl. No. 16/152,277 mailed Dec. 28, 2020, 5 Pages.
Office Communication for U.S. Appl. No. 16/004,182 mailed Jan. 28, 2021, 4 Pages.
Office Communication for U.S. Appl. No. 14/595,598 mailed Feb. 4, 2021, 19 Pages.
Office Communication for U.S. Appl. No. 17/115,529 mailed Feb. 8, 2021, 15 Pages.
Office Communication for U.S. Appl. No. 16/262,756 mailed Feb. 10, 2021, 19 Pages.
Office Communication for U.S. Appl. No. 17/114,384 mailed Feb. 17, 2021, 12 Pages.
Office Action for European Patent Application No. 17206518.7 mailed Feb. 23, 2021, 6 Pages.
Office Communication for U.S. Appl. No. 14/859,114 mailed Mar. 8, 2021, 4 Pages.
Office Communication for U.S. Appl. No. 16/004,182 mailed Mar. 8, 2021, 60 Pages.
Office Communication for U.S. Appl. No. 17/062,500 mailed Mar. 9, 2021, 17 Pages.
Office Communication for U.S. Appl. No. 16/152,277 mailed Mar. 18, 2021, 10 Pages.
Office Communication for U.S. Appl. No. 17/160,698 mailed Mar. 18, 2021, 11 Pages.
Office Communication for U.S. Appl. No. 17/062,500 mailed May 18, 2021, 4 Pages.
Office Communication for U.S. Appl. No. 17/203,371 mailed May 20, 2021, 10 Pages.
Office Communication for U.S. Appl. No. 17/115,529 mailed May 25, 2021, 18 Pages.
Office Communication for U.S. Appl. No. 14/859,114 mailed May 26, 2021, 11 Pages.
Office Communication for U.S. Appl. No. 16/262,756 mailed May 27, 2021, 7 Pages.
Office Communication for U.S. Appl. No. 17/114,384 mailed May 27, 2021, 13 Pages.
Office Communication for U.S. Appl. No. 17/190,653 mailed May 27, 2021, 11 Pages.
Office Communication for U.S. Appl. No. 16/741,567 mailed Jun. 8, 2021, 5 Pages.
Office Communication for U.S. Appl. No. 17/203,452 mailed Jun. 23, 2021, 11 Pages.
Office Communication for U.S. Appl. No. 16/152,277 mailed Jun. 25, 2021, 10 Pages.
Office Communication for U.S. Appl. No. 16/004,182 mailed Jul. 1, 2021, 58 Pages.
Office Communication for U.S. Appl. No. 17/160,698 mailed Jul. 2, 2021, 12 Pages.
Office Communication for U.S. Appl. No. 17/062,500 mailed Jun. 13, 2023, 8 Pages.
Office Communication for U.S. Appl. No. 18/070,705 mailed Jun. 20, 2023, 16 Pages.
Office Communication for U.S. Appl. No. 18/070,705 mailed Feb. 23, 2023, 14 Pages.
Office Communication for U.S. Appl. No. 17/062,500 mailed Feb. 27, 2023, 23 Pages.
Office Communication for U.S. Appl. No. 17/954,640 mailed Mar. 15, 2023, 9 Pages.
Office Communication for U.S. Appl. No. 17/864,190 mailed Apr. 28, 2023, 5 Pages.

(56) References Cited

OTHER PUBLICATIONS

Office Communication for U.S. Appl. No. 17/973,944 mailed May 10, 2023, 9 Pages.
Office Communication for U.S. Appl. No. 17/115,529 mailed May 22, 2023, 25 Pages.
Office Communication for U.S. Appl. No. 17/864,190 mailed Jan. 24, 2023, 12 Pages.
Office Communication for U.S. Appl. No. 17/588,120 mailed Feb. 1, 2023, 15 Pages.
Office Communication for U.S. Appl. No. 17/864,190 mailed Sep. 19, 2022, 10 Pages.
Office Communication for U.S. Appl. No. 17/062,500 mailed Oct. 5, 2022, 4 Pages.
Office Communication for U.S. Appl. No. 17/203,452 mailed Oct. 19, 2022, 9 Pages.
Office Communication for U.S. Appl. No. 17/588,120 mailed Oct. 21, 2022, 5 Pages.
Office Communication for U.S. Appl. No. 17/203,452 mailed Nov. 9, 2022, 2 Pages.
Office Communication for U.S. Appl. No. 17/588,895 mailed Nov. 9, 2022, 11 Pages.
Office Communication for U.S. Appl. No. 17/954,640 mailed Nov. 30, 2022, 10 Pages.
Office Communication for U.S. Appl. No. 17/115,529 mailed Dec. 9, 2022, 21 Pages.
Office Communication for U.S. Appl. No. 17/484,167 mailed May 17, 2022, 3 Pages.
Office Communication for U.S. Appl. No. 17/484,167 mailed Jun. 10, 2022, 5 Pages.
Office Communication for U.S. Appl. No. 17/203,452 mailed Jun. 22, 2022, 22 Pages.
Office Communication for U.S. Appl. No. 14/595,598 mailed Jul. 13, 2022, 9 Pages.
Office Communication for U.S. Appl. No. 17/062,500 mailed Jul. 26, 2022, 20 Pages.
Office Communication for U.S. Appl. No. 17/588,120 mailed Jul. 27, 2022, 34 Pages.
Office Communication for U.S. Appl. No. 17/190,653 mailed Aug. 2, 2022, 8 Pages.
Office Communication for U.S. Appl. No. 17/115,529 mailed Aug. 8, 2022, 21 Pages.
Office Communication for U.S. Appl. No. 17/588,895 mailed Aug. 12, 2022, 12 Pages.
Office Communication for U.S. Appl. No. 17/203,452 mailed Sep. 8, 2022, 4 Pages.
Office Communication for U.S. Appl. No. 17/504,289 mailed Mar. 28, 2022, 9 Pages.
Office Communication for U.S. Appl. No. 17/588,120 mailed Apr. 11, 2022, 36 Pages.
Office Communication for U.S. Appl. No. 17/588,895 mailed Apr. 27, 2022, 6 Pages.
Office Communication for U.S. Appl. No. 17/190,653 mailed Apr. 28, 2022, 13 Pages.
Office Communication for U.S. Appl. No. 17/510,043 mailed Apr. 29, 2022, 10 Pages.
Office Communication for U.S. Appl. No. 17/115,529 mailed Apr. 29, 2022, 4 Pages.
Office Communication for U.S. Appl. No. 17/190,653 mailed Dec. 21, 2021, 12 Pages.
Office Communication for U.S. Appl. No. 14/595,598 mailed Dec. 29, 2021, 19 Pages.
Office Communication for U.S. Appl. No. 17/062,500 mailed Jan. 7, 2022, 4 Pages.
Office Communication for U.S. Appl. No. 16/741,567 malied Jan. 11, 2022, 6 Pages.
Office Communication for U.S. Appl. No. 17/203,452 mailed Jan. 14, 2022, 4 Pages.
Office Communication for U.S. Appl. No. 17/510,043 mailed Jan. 21, 2022, 13 Pages.
Office Communication for U.S. Appl. No. 16/741,567 mailed Feb. 7, 2022, 8 Pages.
Office Communication for U.S. Appl. No. 17/530,420 mailed Feb. 10, 2022, 24 Pages.
Office Communication for U.S. Appl. No. 16/004,182 mailed Feb. 18, 2022, 11 Pages.
Office Communication for U.S. Appl. No. 17/115,529 mailed Feb. 18, 2022, 20 Pages.
Office Communication for U.S. Appl. No. 17/203,452 mailed Feb. 24, 2022, 14 Pages.
Office Communication for U.S. Appl. No. 17/484,167 mailed Mar. 11, 2022, 11 Pages.
Office Communication for U.S. Appl. No. 17/062,500 mailed Mar. 22, 2022, 19 Pages.
Office Communication for U.S. Appl. No. 16/152,277 mailed Oct. 18, 2021, 5 Pages.
International Search Report and Written Opinion for International Patent Application No. PCT/US2021/023525 mailed Oct. 12, 2021, 6 Pages.
Office Communication for U.S. Appl. No. 17/115,529 mailed Oct. 22, 2021, 20 Pages.
Office Communication for U.S. Appl. No. 17/062,500 mailed Oct. 27, 2021, 17 Pages.
Office Communication for U.S. Appl. No. 14/595,598 mailed Oct. 28, 2021, 6 Pages.
Office Communication for U.S. Appl. No. 16/741,567 mailed Oct. 28, 2021, 11 Pages.
Office Communication for U.S. Appl. No. 17/203,452 mailed Nov. 2, 2021, 13 Pages.
Office Communication for U.S. Appl. No. 17/190,653 mailed Nov. 10, 2021, 6 Pages.
Office Communication for U.S. Appl. No. 17/484,167 mailed Nov. 18, 2021, 15 Pages.
Office Communication for U.S. Appl. No. 17/504,289 mailed Dec. 7, 2021, 15 Pages.
Office Communication for U.S. Appl. No. 17/114,384 mailed Dec. 14, 2021, 7 Pages.
Office Communication for U.S. Appl. No. 16/226,587 mailed Aug. 5, 2019, 46 Pages.
Office Communication for U.S. Appl. No. 16/228,716 mailed Jun. 24, 2019, 10 Pages.
Office Communication for U.S. Appl. No. 16/231,354 mailed Jul. 10, 2019, 8 Pages.
Office Communication for U.S. Appl. No. 16/262,756 mailed Aug. 5, 2019, 35 Pages.
Office Communication for U.S. Appl. No. 15/967,499 mailed Jun. 27, 2018, 16 Pages.
Office Communication for U.S. Appl. No. 16/226,587 mailed Feb. 25, 2019, 43 Pages.
Office Communication for U.S. Appl. No. 16/228,716 mailed Feb. 28, 2019, 15 Pages.
Office Communication for U.S. Appl. No. 16/231,354 mailed Mar. 25, 2019, 10 Pages.
Office Communication for U.S. Appl. No. 16/262,756 mailed Apr. 2, 2019, 29 Pages.
Office Communication for U.S. Appl. No. 16/262,790 maned Aug. 23, 2019, 16 Pages.
Office Communication for U.S. Appl. No. 16/262,790 mailed Apr. 18, 2019, 14 Pages.
Office Communication for U.S. Appl. No. 16/262,756 mailed Oct. 25, 2019, 4 Pages.
Office Communication for U.S. Appl. No. 16/659,488 mailed Dec. 30, 2019, 6 Pages.
Office Communication for U.S. Appl. No. 14/595,598 mailed Dec. 31, 2019, 16 Pages.
Office Communication for U.S. Appl. No. 16/004,208 mailed Aug. 27, 2018, 11 Pages.
Office Communication for U.S. Appl. No. 16/234,395 mailed Aug. 8, 2019, 10 Pages.
Office Communication for U.S. Appl. No. 16/234,334 mailed Apr. 5, 2019, 15 Pages.
Office Communication for U.S. Appl. No. 16/234,395 mailed Mar. 28, 2019, 10 Pages.

(56) References Cited

OTHER PUBLICATIONS

Kappes, Giorgos et al., "Dike: Virtualization-awarn Access Control for Multitenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 15/473,051 mailed Jun. 30, 2017, 23 Pages.
Extended European Search Report for European Patent Application No. 18155779.4 mailed Apr. 17, 2018, 15 Pages.
Office Communication for U.S. Appl. No. 16/004,182 mailed Aug. 23, 2018, 43 Pages.
Office Communication for U.S. Appl. No. 16/004,182 mailed Mar. 5, 2019, 46 Pages.
Office Communication for U.S. Appl. No. 16/004,182 mailed Jul. 3, 2019, 45 Pages.
Office Communication for U.S. Appl. No. 15/694,604 mailed Jun. 3, 2019, 8 Pages.
Office Communication for U.S. Appl. No. 16/004,182 mailed May 22, 2019, 4 Pages.
Office Communication for U.S. Appl. No. 14/595,043 mailed May 4, 2017, 30 Pages.
Office Communication for U.S. Appl. No. 14/595,043 mailed Feb. 23, 2018, 16 Pages.
Office Communication for U.S. Appl. No. 14/595,043 mailed May 25, 2018, 7 Pages.
Office Communication for U.S. Appl. No. 14/595,043 mailed Oct. 5, 2018, 17 Pages.
Office Communication for U.S. Appl. No. 14/595,043 mailed Jun. 7, 2019, 19 Pages.
Office Communication for U.S. Appl. No. 14/595,043 mailed Aug. 27, 2019, 17 Pages.
Office Communication for U.S. Appl. No. 14/658,015 mailed Apr. 27, 2017, 7 Pages.
Office Communication for U.S. Appl. No. 14/658,015 mailed Jan. 4, 2018, 28 Pages.
Office Communication for U.S. Appl. No. 14/658,015 mailed Jul. 13, 2018, 8 Pages.
Office Communication for U.S. Appl. No. 14/859,061 mailed Sep. 22, 2017, 16 Pages.
Office Communication for U.S. Appl. No. 15/831,236 mailed Mar. 30, 2018, 8 Pages.
Office Communication for U.S. Appl. No. 15/831,236 mailed Aug. 15, 2018, 14 Pages.
Office Communication for U.S. Appl. No. 14/859,114 mailed Jul. 24, 2017, 41 Pages.
Office Communication for U.S. Appl. No. 14/859,114 mailed Feb. 21, 2018, 25 Pages.
Office Communication for U.S. Appl. No. 14/859,114 mailed May 11, 2018, 5 Pages.
Office Communication for U.S. Appl. No. 14/859,114 mailed Jun. 27, 2018, 33 pages.
Office Communication for U.S. Appl. No. 14/859,114 mailed Nov. 19, 2018, 35 Pages.
Office Communication for U.S. Appl. No. 14/859,114 mailed Jan. 31, 2019, 4 Pages.
Office Communication for U.S. Appl. No. 14/859,114 mailed Mar. 7, 2019, 32 Pages.
Office Communication for U.S. Appl. No. 14/859,114 mailed Jun. 26, 2019, 21 Pages.
Office Communication for U.S. Appl. No. 14/859,114 mailed Sep. 13, 2019, 6 Pages.
Office Communication for U.S. Appl. No. 14/859,114 mailed Nov. 26, 2019, 21 Pages.
Office Communication for U.S. Appl. No. 15/288,853 mailed Sep. 19, 2018, 13 pages.
Chimera, Richard, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 mailed Mar. 25, 2019, 25 Pages.
Cudre-Mauroux, Philippe et al., "TrajStore An Adaptive Storage System for Very Lar ie Trajecto1y Sets", ICDE 2010, Long Beach, CA, Mar. 1-6, 2010, pp. 109-120.
Office Communication for U.S. Appl. No. 16/436,825 mailed Jul. 11, 2019, 9 Pages.
Office Communication for U.S. Appl. No. 15/474,047 mailed Sep. 18, 2017, 14 Pages.
Office Communication for U.S. Appl. No. 15/474,047 mailed Mar. 9, 2018, 8 Pages.
Office Communication for U.S. Appl. No. 15/474,047 mailed Jun. 11, 2018, 6 Pages.
Office Communication for U.S. Appl. No. 15/474,047 mailed Aug. 15, 2018, 11 Pages.
Office Communication for U.S. Appl. No. 15/957,809 mailed Jun. 28, 2018, 27 Pages.
Office Communication for U.S. Appl. No. 15/957,809 mailed Jan. 24, 2019, 11 Pages.
Office Communication for U.S. Appl. No. 16/434,157 mailed Jul. 25, 2019, 8 Pages.
Office Communication for U.S. Appl. No. 15/854,447 mailed May 6, 2019, 9 pages.
Office Communication for U.S. Appl. No. 16/505,562 mailed Aug. 30, 2019, 11 Pages.
Extended European Search Report for European Patent Application No. 17206518.7 mailed Apr. 5, 2018, 8 Pages.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 mailed Jan. 7, 2020, 46 Pages.
Office Communication for U.S. Appl. No. 16/125,573 mailed Nov. 21, 2019, 13 Pages.
Office Communication for U.S. Appl. No. 16/226,587 mailed Oct. 24, 2019, 4 Pages.
Office Communication for U.S. Appl. No. 16/262,790 mailed Dec. 12, 2019, 10 Pages.
Office Communication for U.S. Appl. No. 16/234,334 mailed Jan. 16, 2020, 8 Pages.
Office Communication for U.S. Appl. No. 15/694,604 mailed Nov. 20, 2019, 8 Pages.
Office Communication for U.S. Appl. No. 16/262,756 mailed Jan. 28, 2020, 21 Pages.
Office Communication for U.S. Appl. No. 16/434,157 mailed Jan. 29, 2020, 9 Pages.
Office Communication for U.S. Appl. No. 16/262,790 mailed Feb. 6, 2020, 8 Pages.
Office Communication for U.S. Appl. No. 14/859,114 mailed Mar. 13, 2020, 21 Pages.
Office Communication for U.S. Appl. No. 16/752,451 mailed Mar. 12, 2020, 14 Pages.
Office Communication for U.S. Appl. No. 16/775,041 mailed Mar. 11, 2020, 8 pages.
Office Communication for U.S. Appl. No. 16/779,362 mailed Mar. 26, 2020, 10 Pages.
Wikipedia clustered file system page from elate Jul. 9, 2019, retrieved using the WayBackMachine, From https//web.archive.org/web/20190709083400/tlttps://en.wikipedia.org/wiki/Clustered_file_system (Year: 2019), pp. 1-6.
Wikipedia raft page from date Jul. 16, 2019, retrieved using the WayBackMachine, from tlttps://web.archive.org/web/20190716115001/ https://en.wikipedia.org/wiki/Raft (computer_science) (Year: 2019), pp. 1-4.
Office Communication for U.S. Appl. No. 16/004,182 mailed Mar. 23, 2020, 4 Pages.
Office Communication for U.S. Appl. No. 16/752,509 mailed Apr. 2, 2020, 8 Pages.
Office Communication for U.S. Appl. No. 16/152,277 mailed Apr. 3, 2020, 10 Pages.
Office Communication for U.S. Appl. No. 16/004,182 mailed Apr. 28, 2020, 51 Pages.

(56) References Cited

OTHER PUBLICATIONS

Office Communication for U.S. Appl. No. 16/152,259 mailed Apr. 29, 2020, 19 Pages.
Office Communication for U.S. Appl. No. 14/859,114 mailed Jun. 5, 2020, 5 Pages.
Office Communication for U.S. Appl. No. 16/262,756 mailed Jun. 8, 2020, 22 Pages.
Office Communication for U.S. Appl. No. 14/595,598 mailed Jul. 9, 2020, 19 Pages.
Office Communication for U.S. Appl. No. 16/752,451 mailed Jul. 23, 2020, 8 Pages.
Office Communication for U.S. Appl. No. 14/859,114 mailed Jul. 23, 2020, 21 Pages.
Office Communication for U.S. Appl. No. 16/152,615 mailed Aug. 6, 2020, 7 Pages.
Office Communication for U.S. Appl. No. 16/779,362 mailed Aug. 7, 2020, 11 Pages.
Office Communication for U.S. Appl. No. 17/864,190 mailed Dec. 6, 2024, 8 Pages.
Office Communication for U.S. Appl. No. 18/503,082 mailed Jan. 28, 2025, 8 Pages.
Office Communication for U.S. Appl. No. 18/945,343 mailed Feb. 24, 2025, 25 Pages.
International Search Report and Written Opinion for International Patent Application No. PCT/US2024/053881 mailed Jan. 21, 2025, 14 Pages.
International Search Report and Written Opinion for International Patent Application No. PCT/US2024/054442 mailed Feb. 10, 2025, 8 Pages.
Ryousei Takano, File System Ext2/Ext3, Software Design, No. 161, Mar. 18, 2004, 16 pages with English translation.
Naohiro Aota, "F2FS optimized for flash memory", NIKKEI Linux, vol. 17 No. 3, Mar. 3, 2015, 7 pages with English translation.

\* cited by examiner

VERIFYING PERFORMANCE CHARACTERISTICS OF NETWORK INFRASTRUCTURE FOR FILE SYSTEMS

TECHNICAL FIELD

The present invention relates generally to file systems, and more particularly, but not exclusively, to verifying performance characteristics of network infrastructure for file systems.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. Further, reliable or highly-available file systems may be expected to perform various actions to operate, recover from errors, perform backups, rebalancing data, or the like, that may consume significant system bandwidth.

Also, in many cases, performance or reliability of distributed file systems may be dependent on the quality of the network infrastructure that the file system may be hosted within. Accordingly, in some cases, a mismatch in capabilities of various network infrastructure components may result in poor file system performance, reduced reliability, or reduced availability. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
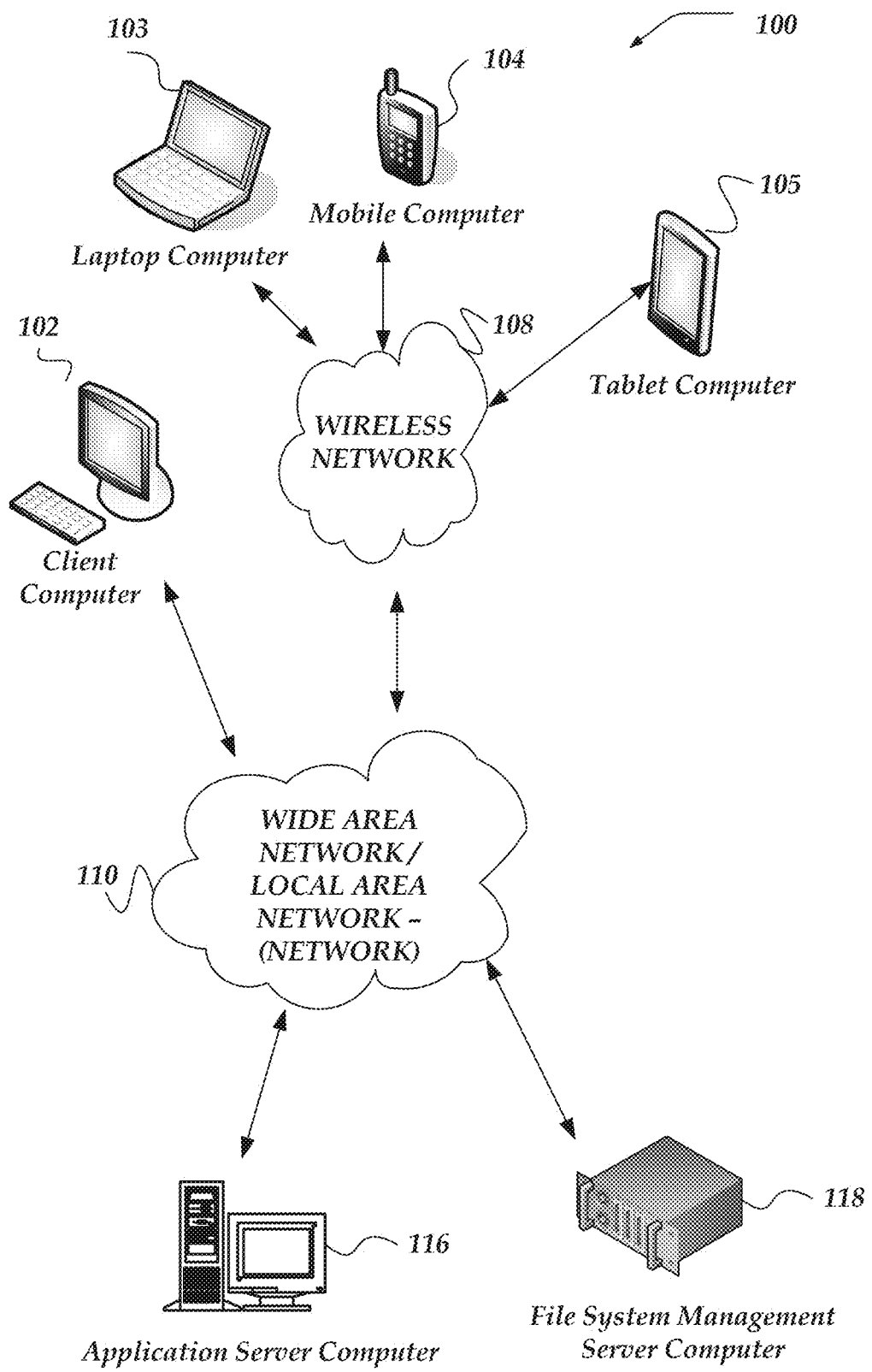
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage devices and be stored on and executed by one or more general purpose computers, thus creating a special purpose computer configured to provide the engine.

As used herein the terms "data block," "file system block," refer to the portions of data used to store data in a file system. For example, small sized items such as, directories or small files may be comprised of a single block. Whereas larger files, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), cloud-based block storage, or the like. However, files or other items stored in file systems may be of various sizes, comprised of the number of blocks necessary to represent or contain the data or meta-data for the item.

As used herein, the terms "network infrastructure component handler," or "component handler" refer to data structures that encapsulate instructions, scripts, rules, libraries, objects, or the like, to enable file systems to interact with particular network infrastructure components, such as network interfaces, switches, hubs, bridges, routers, firewall, or the like, that may be included the network infrastructure where the file system may be operating. Component handlers may be customized to employ APIs, protocols, messaging formats, or the like, that enable communication with particular network infrastructure components. For example, network infrastructure components from different manufacturers may have different features or interfaces such that specialized component handlers may be used for different network infrastructure components. In some cases, component handlers may be configured to support one or more standard protocols, such as Link Layer Discovery Protocol (LLDP) to interact with network infrastructure components.

As used herein, the term "file system operation" refers to various actions performed in a file system. These include actions performed by (or on behalf of) clients of file systems, such as reads, writes, moves, deletes, renaming, updates, listings (e.g., directory listings), or the like. Generally, actions performed on behalf of file system clients may be referred to as client requests or requests. Also, file system operations may include actions performed as part of the administration, operation, or maintenance of file systems, such as file system backup operations, data mirroring, data replication, data rebalancing, data pre-fetching, proactive data updates, notifications/messaging, data protection operations, snapshot operations, data recovery operations, file system control plane communications, meta-data sharing, or the like.

As used herein, the terms "file system operation handlers," or "operation handlers" refer to data structures that encapsulate instructions, scripts, rules, libraries, objects, or the like, that may be used to integrate various file system operations with network infrastructure. Operations handlers may be configured to associate one or more file system operations with particular network infrastructure configurations or network infrastructure integration actions. Operation handlers may selectively employ one or more component handlers to interact with network infrastructure components. Note, in some cases, component handlers or operation handlers may be included in the same data structures, processes, libraries, or the like, rather than being separate.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system over a network. In one or more of the various embodiments, a plurality of file system operations in the file system may be executed based on one or more of a file system client action or a file system administrative action such that the file system may be integrated with a network infrastructure that includes a plurality of network devices or network components.

In one or more of the various embodiments, one or more characteristics of the plurality network devices or network components in the network infrastructure that may be associated with the file system may be determined based on one or more discovery operations.

In one or more of the various embodiments, one or more tests may be generated based on the one or more characteristics of the plurality of network devices or network components such that the one or more tests may be executed to evaluate the plurality of network devices.

In one or more of the various embodiments, one or more results of the one or more tests may be employed to perform further actions, including: determining one or more non-compliant network devices (or network components) of the plurality of network devices or network components based on the one or more results; modifying the network infrastructure based on the one or more non-compliant network devices or non-compliant network components such that one or more of the plurality of file system operations are modified based on the one or more non-compliant network devices; executing the one or more modified file system operations on the modified network infrastructure; or the like.

In one or more of the various embodiments, one or more features of the network infrastructure may be determined based on real-time monitoring of network activity in the network infrastructure such that the one or more features may include one or more of a default gateway, a domain name service server, a cloud endpoint, a file system replication cluster, a time service, or the like. Also, in one or more of the various embodiments, one or more characteristics of one or more portions of the network infrastructure may be determined based on the one or more features such that the one or more portions of the network infrastructure may include one or more of a sub-network, a virtual local area network (VLAN), a path from a network endpoint in the file system to a target network endpoint, or the like.

In one or more of the various embodiments, the one or more discovery operations may include: executing one or more actions to interrogate the plurality of network devices or network components based on one or more of an application programmer interface (API), a schema, a library, or a protocol; determining the one or more characteristics of the plurality of network devices or network components based on the interrogation such that the plurality of network devices or network components include one or more of a network interface, a network switch, a hub, a network bridge, a router, an access point, a load balancer, a modem, a gateway, a firewall, or the like.

In one or more of the various embodiments, one or more untested network devices (or network components) or one or more untested portions of the network infrastructure that may be unassociated with a test may be determined based on a comparison of the one or more tests with the plurality of network devices and the network infrastructure.

In one or more of the various embodiments, one or more other tests may be generated based on the one or more untested network devices or the one or more untested portions of the infrastructure such that the one or more other tests may be executed to evaluate the one or more untested network devices or the one or more untested portions of the infrastructure.

In one or more of the various embodiments, the one or more tests may include one or more of a connectivity test, a domain name service (DNS) resolution test, an endpoint reachability test, a replication synchronization test, a quality of service test, a network stability test, a bandwidth test, a latency test, a network packet loss test, a time synchronization test, or the like.

In one or more of the various embodiments, generating the one or more tests may include: determining one or more test stems associated with one or more target network devices (or components) of the plurality of network devices such that the one or more test stems may include one or more template fields; generating one or more candidate tests based on populating the one or more template fields with the one or more characteristics of the one or more target network devices such that the one or more characteristics may include one or more of a network address, a MAC address, an application programmer interface (API) parameter, or the like; validating the one or more candidate tests based on the one or more target network devices such that each invalid candidate test may be discarded.

In one or more of the various embodiments, executing the plurality of file system operations may include executing one or more of a file system client request, a file system backup operation, a file system recovery operation, a replication operation, a meta-data update operation, a snapshot operation, a data protection operation, a rebalancing operation, or the like.

In one or more of the various embodiments, the plurality of network devices (or network components) may be determined based on one or more of a configuration database, a system log file, a network monitoring service, an event log, or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanisms and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 is described in more detail below in conjunction with FIG. 3. Although FIG. 1 illustrates file system management server computer 118, or the like, each as a single computer, the innovations or embodiments are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
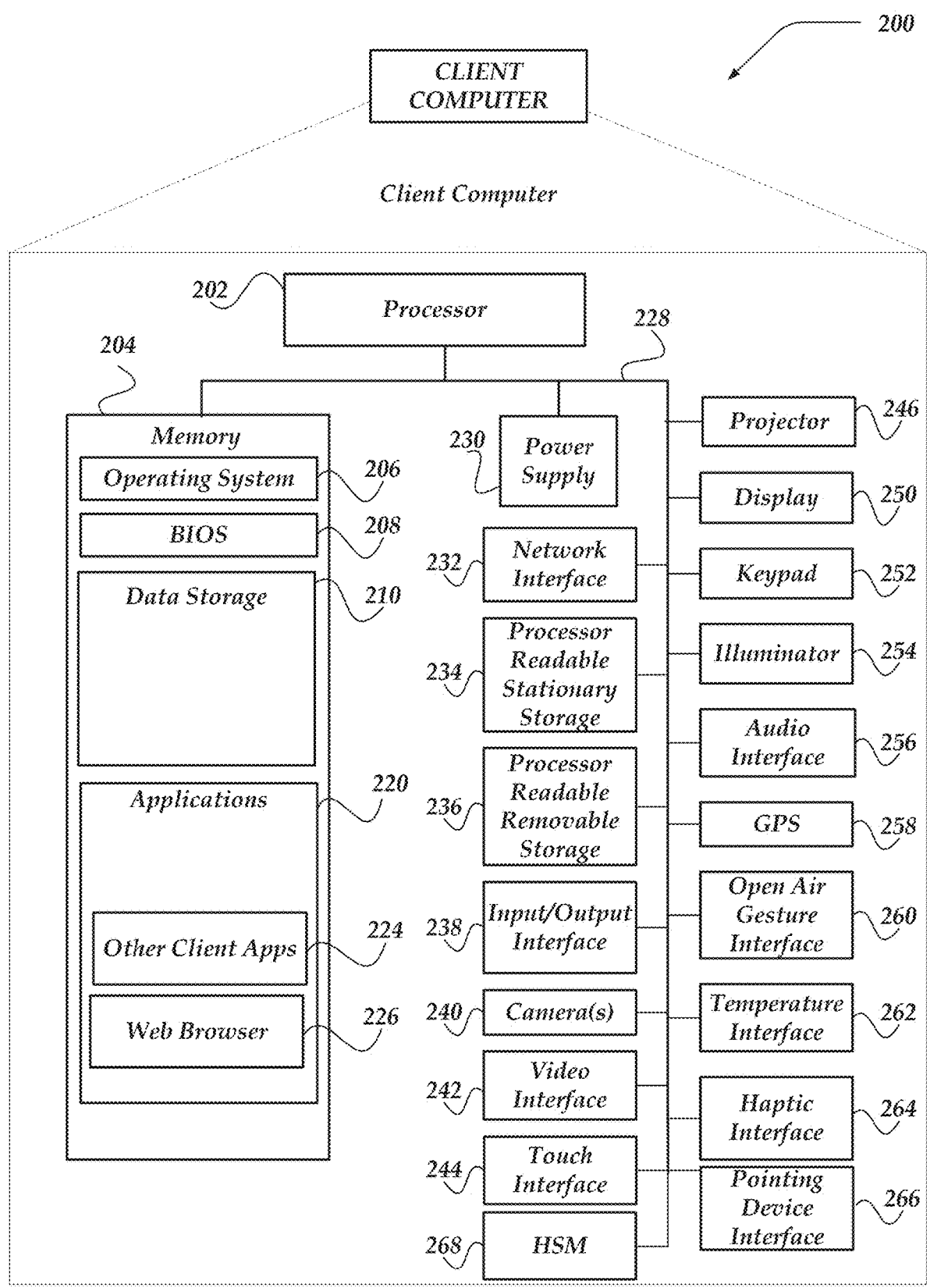
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measure or maintain an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications with one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
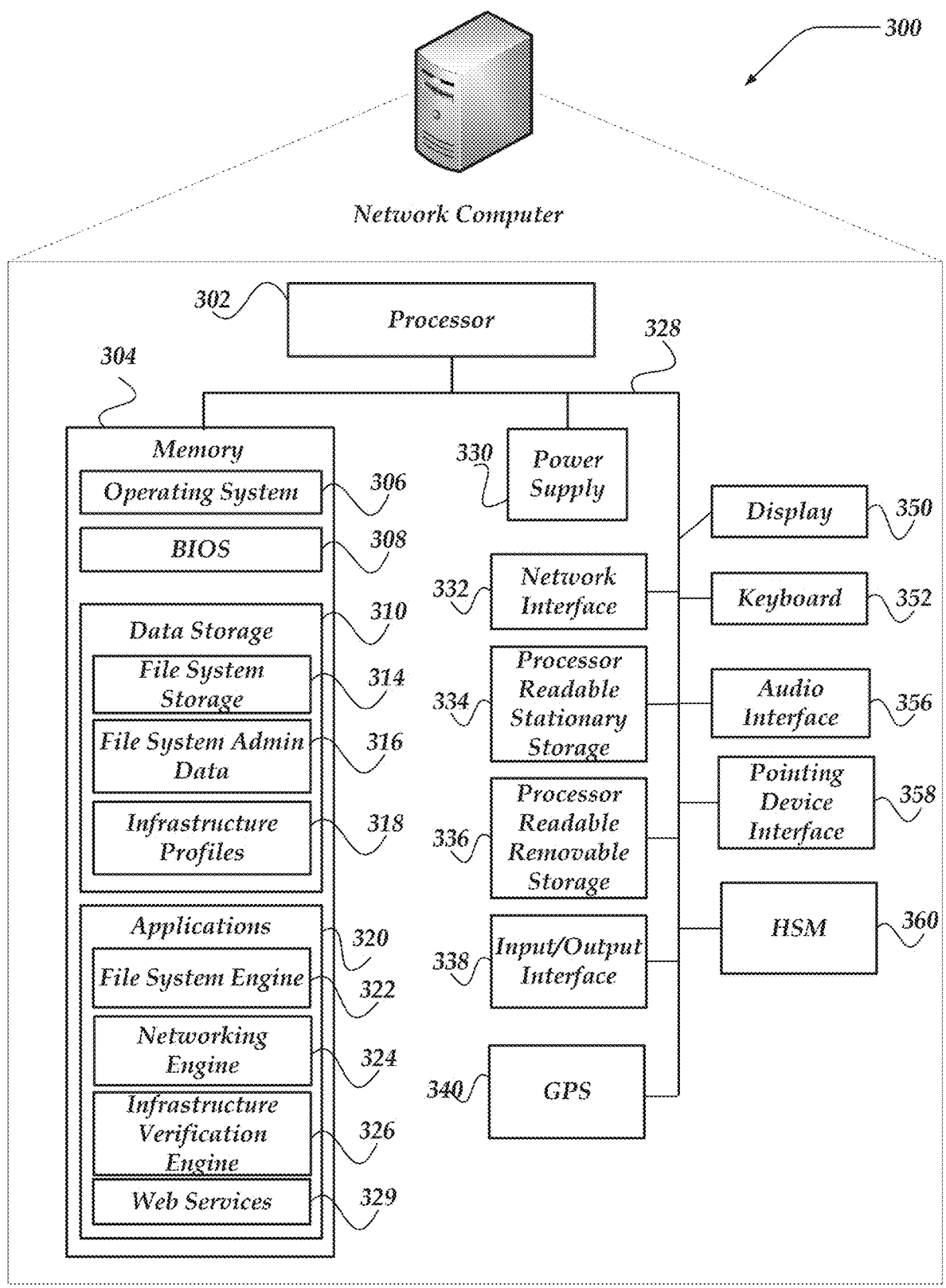
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, networking engine 324, infrastructure verification engine 326, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system administration data 316, network infrastructure profiles 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, networking engine 324, infrastructure verification engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, networking engine 324, infrastructure verification engine 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, networking engine 324, infrastructure verification engine 326, web services 329, or the like, may be provisioned and de-commissioned automatically.

Also, in one or more of the various embodiments, file system engine 322, networking engine 324, infrastructure verification engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
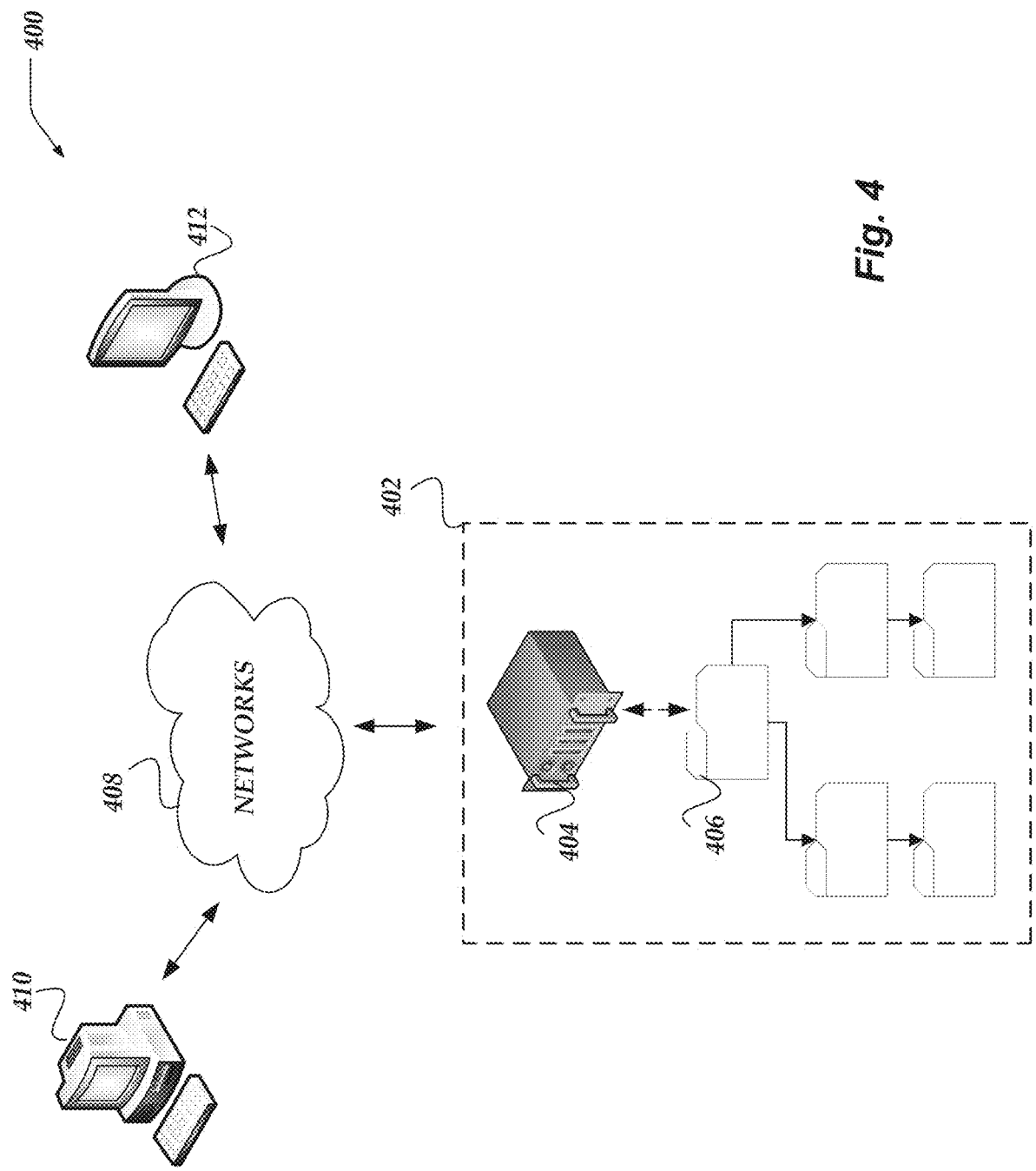
FIG. 4 illustrates a logical architecture of a system for verifying performance characteristics of network infrastructure for file systems in accordance with one or more of the various embodiments.

FIG. 4 illustrates a logical architecture of system 400 for verifying performance characteristics of network infrastructure for file systems in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, or deleting data (e.g., files, directories, documents, file system metadata, or the like) that may be stored in file system 402.

In some embodiments, file system 402 may comprise one or more file system management computers, such as file system management computer 404. Also, in one or more of the various embodiments, file systems, such as file system 402 may include one or more file system items, such as item 406. In one or more of the various embodiments, item 406 may be considered to represent the various file system items, such as, documents, files, or the like, that may be stored in file system 402. In some embodiments, file system items may include files, documents, directories, folders, backups, snapshots, replication snapshots, replication information, or the like. In some embodiments, some file system items may be comprised of smaller file system items. Accordingly, in some embodiments, blocks or data blocks may be considered to be the smallest file system items that comprise other more complex file system items, such as, files, documents, or the like.

In some embodiments, file system management computers may be automatically selected from among the one or more cluster nodes in a distributed file system rather than being reserved to a particular computer or cluster node. Accordingly, in some embodiments, if a file system management computer may be needed, cluster nodes may be arranged to elect a file system management computer from among their peer nodes.

In one or more of the various embodiments, the implementation details that enable file system 402 to provide file system services may be hidden from clients, such that they may use file system 402 the same way they use other conventional local or remote file systems. Accordingly, in one or more of the various embodiments, clients may be unaware that they are using a distributed file system that supports sharing namespaces across file system clusters because file system engines may be arranged to mimic the interface or behavior of one or more conventional file systems.

Also, while file system 402 is illustrated as using one file system management computer with one set of file system items, these innovations are not so limited. Innovations herein contemplate file systems that may include one or more file system management computers or one or more file system item data stores. In some embodiments, file system items may be located remotely from one or more file system management computers. Also, in some embodiments, file systems may be spread across cloud computing environments, storage clusters, or the like.

Figure 5:
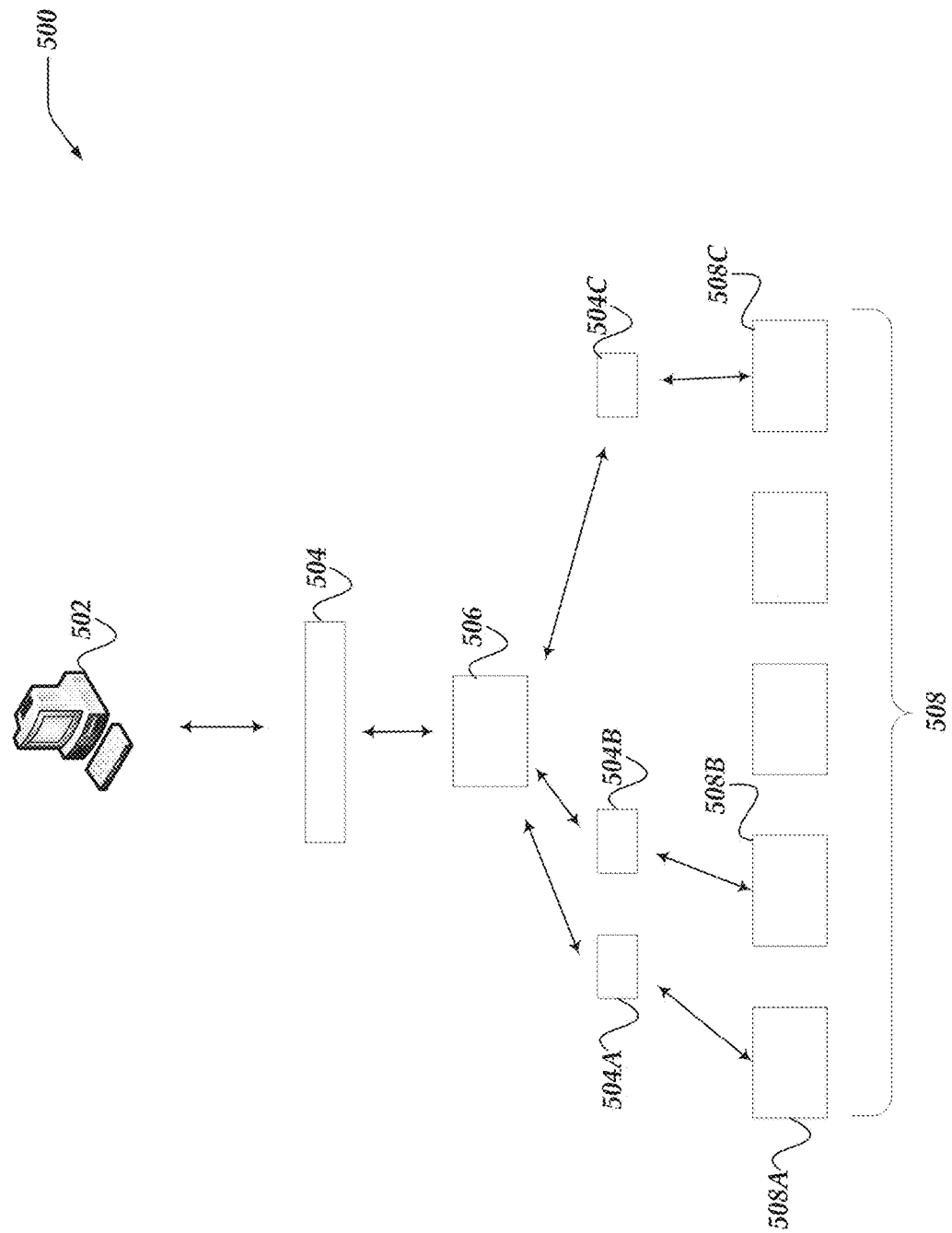
FIG. 5 illustrates a logical schematic of a file system for verifying performance characteristics of network infrastructure for file systems in accordance with one or more of the various embodiments.

FIG. 5 illustrates a logical schematic of file system 500 for verifying performance characteristics of network infrastructure for file systems in accordance with one or more of the various embodiments. FIG. 5 is provided to help illustrate how file system-wide command transactions may be broken down into parts (e.g., requests) that may be distributed to different nodes or protection stores in distributed file systems. Note, in this example, a protection store may be considered a portion of addressable file system storage that may be available in a file system. In some embodiments, each protection store may represent a portion of the address space of a given file system. In some embodiments, protection stores may be allocated or distributed according to one or more data protection schemes, striping schemes, RAID configurations, or the like, that may provide a desired level of data protection, performance, high-availability, or the like, that may vary depending on the given file system.

In some embodiments, file system clients may be enabled to issue various file system commands (e.g., read file, remove file, save file, or the like) to a file system engine that may initiate one or more command transactions. Accordingly, in some embodiments, file system engines may be arranged to determine which portion of the command transaction may be satisfied by various nodes or protection stores in the greater file system. In some embodiments, portions of the command transaction may be provided to designated nodes or protection stores as directed by file system engines as read requests or write requests. In some embodiments, if each request associated with a command transaction may be completed, the command transaction may be considered committed. Similarly, in some embodiments, if one or more requests (portions of the command transaction) fail to commit locally in their designated node or protection store, the other requests associated with the same command transaction that may have locally succeeded may be rolled back.

In this example, for some embodiments, file system client 502 may submit a file system command to file system engine 506 that initiates a command transaction, such as, as transaction 504. In practice, command transaction 504 may be a read transaction or a write transaction. Accordingly, in some embodiments, read transactions may be directed to reading file system items (e.g., files, documents, directory listings, or the like) from the file system. Likewise, in some embodiments, write transactions may be providing data to be stored as file system items in the file system, modifying existing file system items, or deleting existing file system items.

In some embodiments, file system engines, such as file system engine 506 may receive transaction 504. Accordingly, in some embodiments, file system engine 506 may be arranged to divide the transaction across one or more protection stores, cluster nodes, or the like. Note, different file systems may employ different or distinct strategies for data protection, parallelism, high-availability, or the like, that may influence how the work or data for command transactions may be distributed in a file system. Thus, for brevity, details of these various strategies are omitted here.

In this example, for some embodiments, request 504A, request 504B, and request 504C may represent portions of command transaction 504 that may be distributed to different nodes or protection stores in a file system.

Accordingly, in some embodiments, nodes/protection stores 508 may be provided requests that may be part of the larger command transaction. In this example, for some embodiments, node/protection store 508A, node/protection store 508B, and node/protection store 508C may be selected for servicing the requests that make up command transaction 504.

In some cases, for some embodiments, nodes/protection stores may receive read requests that may be requesting one or more data blocks as defined by file system addresses, address ranges, or the like. Accordingly, in some embodiments, the nodes/protection stores may be arranged to locate and load the data blocks for the read requests they may be directed to service. These data blocks may be returned to contribute to completing the entire read transaction. In some embodiments, if each read request is completed successfully, the read transaction may be considered successful, and the data blocks provided for the read requests may be returned to the calling client.

Similarly, some requests may be write requests for a write command transaction. Accordingly, in some embodiments, each write request may include one or more data blocks to store at the determined node/protection store. Also, in some embodiments, delete operations may be considered write requests. However, delete requests may include information about which data blocks are to be deleted rather than including the data blocks themselves. If each write request succeeds the write transaction may be considered successful. Accordingly, the file system may provide an acknowledgment to the file system client that the write transaction was completed successfully. In some embodiments, if one or more of the write requests fail, the write transaction may be considered failed. Accordingly, in some embodiments, any associated successful write requests associated with the failed transaction may be determined and rolled back.

Further, in some embodiments, each single node may include or be associated with multiple disks, cloud-based block storage devices, object stores, or the like. Thus, in some cases, multiple protection stores may be allocated on the same node such that the separate protection stores may be distributed across different storage systems (e.g., disks, cloud-based block storage, objects, or the like) associated with the single node.

Note, in some embodiments, file systems may be arranged to include a single node/protection store such that each transaction may essentially be considered a request.

For brevity and clarity, innovations disclosed herein are generally described in the context of a single node/protection store that is handling read requests or write requests that may be part of larger read transaction or write transaction. Accordingly, in some embodiments, mechanisms, such as those associated with allocating protection stores across a file system, data protection (e.g., erasure coding), encryption, rebalancing of data stored in a file system, routing requests, dividing transactions into requests, or the like, are omitted. One of ordinary skill in the art will appreciate that disclosures herein are at least sufficient for integrating the disclosed and recited innovations into a wide variety of file systems or file system architectures.

Figure 6:
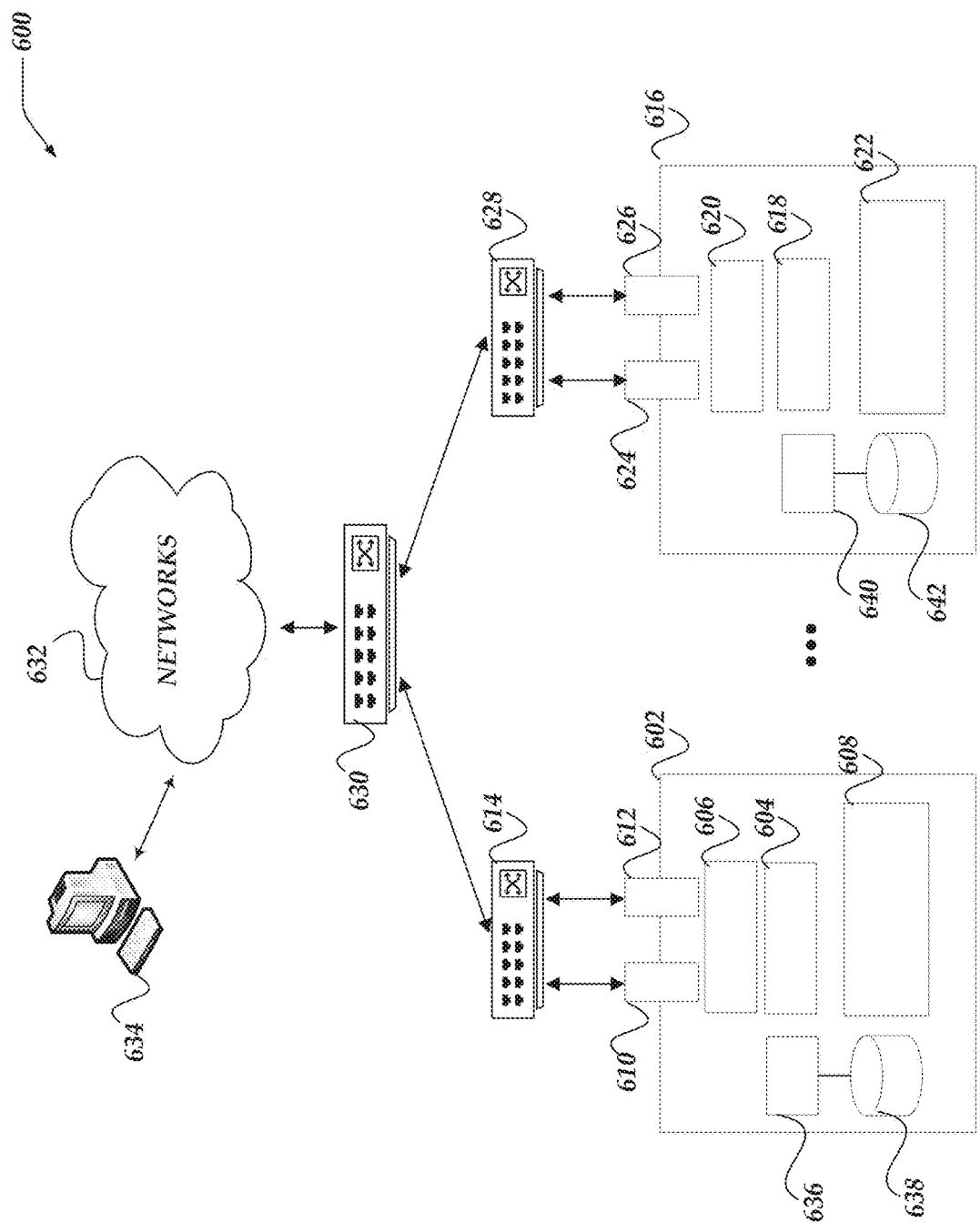
FIG. 6 illustrates a logical schematic for a file system for verifying performance characteristics of network infrastructure for file systems in accordance with one or more of the various embodiments.

FIG. 6 illustrates a logical schematic for file system 600 for verifying performance characteristics of network infrastructure for file systems in accordance with one or more of the various embodiments. As described above, in some embodiments, file systems may be comprised of one or more file system nodes or one or more file system clusters. In the example, for some embodiments, file system node 602 may include file system engine 604, networking engine 606, file system storage 608, network interface 610, network interface 612, or the like. Likewise, in this example, for some embodiments, file system node 616 may include file system engine 618, networking engine 620, file system storage 622, network interface 624, network interface 626, or the like. Further, in some embodiments, file system nodes, such as file system node 602 or file system node 616 may be connected to one or more switches, such as switch 714 or switch 728. In some embodiments, switches, such as switch 714 or switch 728 may enable file system nodes to connect with other switches or spine switches, such as spine switch 630. Accordingly, in some embodiments, spine switches, such as spine switch 630 may be configured to provided network connectivity to one or more other networks, such as networks 632 to enable one or more file system clients, such as file system client 634 to access various file system services enabled by file system 600. Further, in some embodiments, file systems, such as file system 600 may be arranged to include one or more infrastructure verification engines, such as verification engine 636, verification engine 638, or the like. Also, in some embodiments, verification engines may generate or employ one or more component profiles (not shown) that may be stored in data stores, such as component profile data store 638, component profile data store 642, or the like.

Note, one of ordinary skill in the art will appreciate that in practice networking environments may include various network infrastructure components, such as hubs, switches, bridges, routers, firewalls, or the like, and in some cases a same device may perform two or more overlapping roles that may fall under different categories. Thus, for brevity and clarity switch 614, switch 628, or switch 630, or the like, may be considered to represent various network devices or network components that may comprise network infrastructure rather than being strictly limited to network switches.

In some embodiments, file system performance may often be dependent on network performance or network configuration. Also, in some embodiments, network performance may be dependent on how file systems execute or perform various operations that may consume significant networking capacity. For example, if network infrastructure may be under provisioned or incorrectly configured, file systems may be less performant than desired or expected because of the limitations in bandwidth, latency, path/route contention, or the like, that may impact file system performance. Similarly, in some embodiments, large or active file systems may consume an amount of network resources such that other critical services in the networking environment may be starved of network access or network throughput, or otherwise disadvantaged.

Accordingly, in some embodiments, it may be advantageous for file systems to proactively and dynamically integrate with the network infrastructure that may be hosting the file system. Accordingly, in some embodiments, file system engines may be arranged to integrate with network infrastructure to enable the file system to actively manage one or more characteristics of the network infrastructure. Thus, in some embodiments, file system engines may be arranged to dynamically modify file system behavior or network infrastructure configurations to adapt to different circumstances.

In some embodiments, file system nodes (network computers) may include networking engines, such as networking engine 324 (in FIG. 3). In some embodiments, networking engines may be arranged to execute various actions associated communicating or verifying performance characteristics of network infrastructure for file systems. In some embodiments, networking engines may be included within file system engines rather than being separate processes or applications. Also, in some embodiments, some portions of networking engines may be embedded in networking infrastructure components rather than strictly being hosted on file system nodes. In some embodiments, the allocation of networking engine components may vary depending on the capabilities of the network infrastructure. For example, in some embodiments, if the switches in a file system may be considered "dumb" switches that have limited support for active integration, networking engines on file system nodes may be configured to perform most or all of the networking related actions. In contrast, in some embodiments, if the switches in the file system may be smart switches that provide one or more onboard features, such as remote management, remote monitoring, configuration communication protocols, network address selection/pooling, interface pooling, interface aggregation, or the like, networking engines may be configured to employ APIs or communication protocols to leverage the onboard features of smart infrastructure devices to support or improve file system operations, including at least verifying performance characteristics of network infrastructure components.

Also, in some embodiments, it may be advantageous for file systems to verify performance characteristics of network infrastructure to enable or validate various performance requirements associated with file system operations. Accordingly, in some embodiments, file systems may employ networking engines to proactively validate or discover the performance characteristics of various network infrastructure components. Also, in some cases, there may be significant performance variation across the same make/model of a given device. Accordingly, in some embodiments, relying on manufacturer provided specifications may be insufficient to maximize file system performance. Similarly, in some embodiments, various performance characteristics of network infrastructure components may degrade over time. For example, as electronic components (e.g., transistors, resistors, capacitors, inductors, solder points, or the like) degrade, they may introduce performance degradation into the given network devices.

Further, in some cases, various network infrastructure components may appear to be performing to specifications (or expectations) in some circumstances while performing poorly in other circumstances. For example, a network interface may perform to expectation within certain temperature ranges while outside of the those ranges its performance may degrade-even though the operating temperatures remain within the manufacturer specifications. Likewise, for example, devices may perform to specifications while operating for some activities or loads while performing poorly for some other activities or loads even though the activities or loads are within advertised expectations for the devices.

Thus, in some embodiments, verifying performance characteristics of network infrastructure may be critical to ensure that the file system performance characteristics meet requirements or expectations.

Accordingly, in some embodiments, file systems may be arranged to include one or more verification engines, such as verification engine 638 or verification engine 640. In some embodiments, verification engines may be arranged to characterize the network infrastructure components relied upon by file systems. Also, in some embodiments, verification engines may be arranged to generate one or more automated test suites to determine or verify one or more characteristics of various network infrastructure components. Accordingly, in some embodiments, verification engines may be arranged to generate one or more component profiles for the various network infrastructure components. In some embodiments, component profiles (not shown here) may be considered data structures that may be employed to record metrics associated with various performance or capability characteristics of various network infrastructure components or network infrastructure portions.

In some embodiments, verification engines or file system engines may be arranged to store component profiles in data stores such as data store 638 or data store 640. In some embodiments, these data stores may be files (e.g., XML, CSV, YAML, or the like), relational databases, key value stores, or the like. Accordingly, in some embodiments, file system engines or verification engines may be arranged to determine the mechanism for storing or accessing component profiles via configuration information to account for local circumstances or local requirements.

In this example, for some embodiments, each file system node (e.g., file system node 602, file system node 616, or the like) is illustrated as including a verification engine and component profile data store. However, in some embodiments, verification engines or component profile data stores may be included on one or some file system nodes rather than being executed on each node in a file system cluster. For example, in some embodiments, a controller node of a file system cluster may be configured to host verification engines or component profile data stores. Also, in some embodiments, verification engines or component profile data stores may be hosted on computers that may not be file system nodes. For example, in some embodiments, verification engines or component profile data stores may be running on one or more other network computers that may be separate from the file system nodes. Further, in some embodiments, verification engines may be configured to employ configuration databases, LDAP services, LLDP, SNMP, or the like, to gather information about network infrastructure components rather than being limited to directly collecting metrics or performance information.

Further, in some embodiments, while file system 600 may be described here using physical networks or physical hardware devices, one of ordinary skill in the art will appreciate that some or all portions of file systems, such as file system 600 may be hosted in cloud computing environments. In some embodiments, file system nodes may be virtual computers provisioned in the cloud environment. Also, in some embodiments, one or more network infrastructure components or network devices may be provided in a cloud environment using virtualized devices, cloud based services, Software as a Service (SaaS) features provided by the cloud computing environment, virtualized network interfaces, virtualized switches, virtualized routers, virtualized firewalls, virtualized block storage, virtualized object storage, or the like. Thus, one of ordinary skill in the art will appreciate that the innovations disclosed herein anticipate operating in physical environments, cloud computing environments, or hybrid computing environments. Also, in some embodiments, some or all the networking infrastructure used by file systems may be provided as so-called software defined networks, physical network infrastructure, or combinations thereof. Further, for at least brevity and clarity the term network infrastructure components may be used to refer to various network devices or network appliances whether they are physical devices, virtualized devices, services (e.g., SaaS), or the like.

Figure 7:
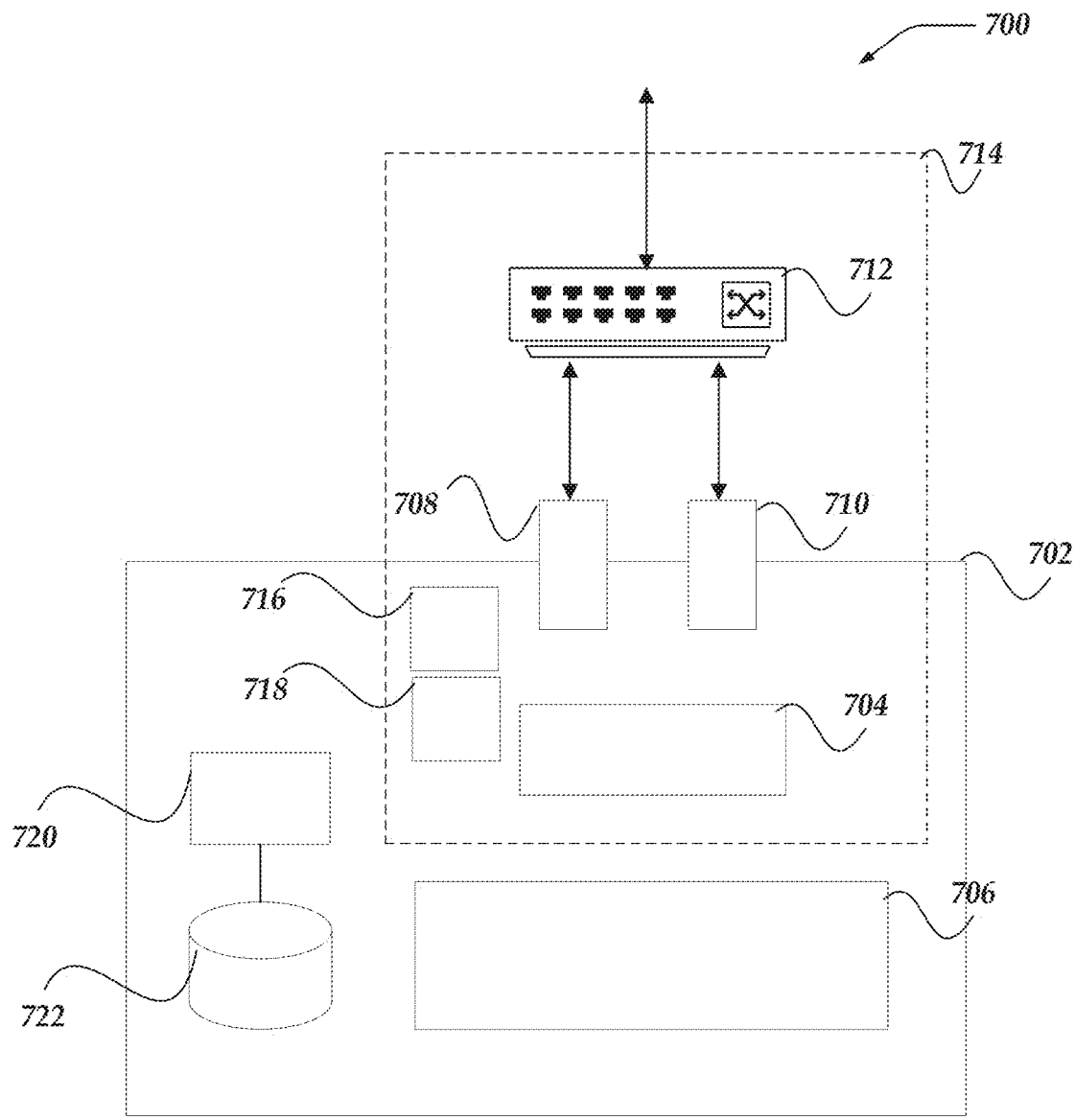
FIG. 7 illustrates a logical schematic for a file system node for verifying performance characteristics of network infrastructure for file systems in accordance with one or more of the various embodiments.

FIG. 7 illustrates a logical schematic for file system node 700 for verifying performance characteristics of network infrastructure for file systems in accordance with one or more of the various embodiments. As described above, file system nodes, such as file system node 702 may include: file system engines, such as file system engine 704; file system storage, such as file system storage 706; one or more network interfaces, such as network interface 708 or network interface 710; a switch, such as switch 712; a networking engine, such as networking engine 714. Also, in some embodiments, file system engines or networking engines may be arranged to include one or more network infrastructure component handlers, such as network infrastructure component handlers 716. Also, in some embodiments, file system engines or networking engines may be arranged to include one or more file system operations handlers, such as file system operation handlers 718. Further, in some embodiments, file systems may be arranged to include one or more verification engines, such as verification engine 720 or one or more network infrastructure component profile data stores, such as data store 722.

In this example, for some embodiments, networking engine 714 is illustrated using a dashed bounding box to represent that its features or functions may be spread across different parts of file systems or file system nodes. For example, in some embodiments, if switch 712 may be a smart switch that offers features, such as remote configuration, remote monitoring, automatic status reporting, messaging, remote interrogation of performance metrics, or the like, logically portions of networking engine 714 may be considered to be provided by switch 712, or the like. Also, in some embodiments, some network interfaces may offer various features or functions that enable networking engine operations. And, in some embodiments, file system engines, such as file system engine 704 may incorporate or embed some or all networking engine functionality. Accordingly, in some embodiments, the responsibilities attributed to networking engines may be shared across file system nodes or one or more network infrastructure components depending on the capabilities of the given network infrastructure component.

For example, in some embodiments, if switch 712, network interface 708, network interface 710, or the like, are considered dumb devices, or otherwise omit features or functionality to support verifying performance characteristics of network infrastructure for file systems, networking engine 714 may be considered to be operating exclusively on file system node 702. In contrast, in some embodiments, if switch 712, or the like, may provide direct/onboard support for verifying performance characteristics of network infrastructure for file systems, portions of networking engine 714 may be considered to be provided or hosted on switch 712, or the like. In such cases, for some embodiments, network infrastructure component handlers may be configured to pass-thru commands or information from the smart devices to the file system operation handlers, networking engines, verification engines, or the like.

Accordingly, in some embodiments, networking engine 714 is illustrated using a dashed line bounding box that overlaps several components of file system node 702 to represent how the functions or features of networking engine 714 may be configured to be distributed among or across different components depending on the capabilities of those components. For example, in some embodiments, networking engines may be configured to monitor network traffic rate by querying a network interface or switch if those devices support such performance metric monitoring or reporting. Also, for example, in some embodiments, if the switch or network interfaces do not support such reporting or traffic accounting, networking engines may be arranged to employ operating system level services, software based performance monitors, or the like, to determine (or estimate) network traffic rate information.

In some embodiments, network infrastructure component handlers, such as network infrastructure component handlers 716 may be data structures that include or reference rules, instructions, parsers, APIs, or the like, that may be arranged to integrate with particular network infrastructure components. In some cases, for some embodiments, one or more network infrastructure component handlers may be configured for particular network infrastructure components. For example, in some embodiments, a component handler for a particular smart component may be arranged to communicate with the particular components using network protocols, APIs, or the like, that enable integration with the particular components. Thus, in some embodiments, component handlers may be assumed to include data structures or instructions for interpreting messages from components, sending messages to components, or the like. In some embodiments, component handlers may be configured to wrap libraries or APIs provided by network infrastructure component manufacturers.

In some embodiments, some or all component handlers may be built into file system engines or networking engines. Also, in some cases, component handlers or one or more portions of component handlers may be provided or hosted by particular network infrastructure components such that some or all functionality or responsibility for verifying performance characteristics of network infrastructure for file systems may be integral to one or more network infrastructure components rather than being limited to executing on a file system node.

Accordingly, in some embodiments, as new or different network infrastructure components may be encountered, additional component handlers may be included as well. Thus, in some embodiments, file system engines or networking engines may be arranged to provide one or more network infrastructure component handlers via configuration information to account for local circumstances or local requirements.

Further, in some embodiments, file system engines or networking engines may be arranged to include one or more file system operation handlers, such as file system operation handlers 718. In some cases, for brevity, file system operation handlers may be referred herein as operation handlers. In some embodiments, operation handlers may be data structures that encapsulate libraries, objects, rules, instructions, or the like, that determine one or more particular file system operations to perform in response to messages, status changes, or the like, that may be provided by network infrastructure components. For example, in some embodiments, if an integrated network infrastructure component indicates that it may be going offline, a file system operation handler may be activated to perform or initiate one or more actions in response to the network infrastructure activity. In some cases, in some embodiments, operation handlers may include a map that associates one or more infrastructure events with one or more file system operations. Also, in some cases, for some embodiments, file system operation handlers may be complex libraries that may be tightly integrated with file system engines. In some embodiments, file system engines may be arranged to be highly adaptable to support various file system operations, including new operations that may come online at later date with new versions of the file system. Also, in some embodiments, the level of network infrastructure integration supported by file system engines may vary depending on the version or configuration of the file system. For example, the level of integration may vary depending on the type of license a file system user may have. Thus, in some embodiments, file system engines may be arranged to determine file system operations handlers based on configuration information to account for local circumstances or local requirements.

Also, in some embodiments, as described above, verification engines, such as verification engine 720 may be arranged to generate or execute one or more automated tests or test suites that may be employed verify the characteristics of various network infrastructure components. Accordingly, in some embodiments, verification engines may be arranged to generate component profiles that may provide continuously updated performance information associated with the verified components.

Further, in some embodiments, verification engines may be arranged to generate one or more of notifications, alerts, reports, or the like, if one or more metrics associated with verified components should fall below (or exceed) threshold values or fall outside of a declared range of values. Accordingly, in some embodiments, verification engines may enable file system operators to identify network infrastructure components that may be operating outside of expectations. Also, in some embodiments, file system operations handlers or file system engines may be configured to automatically adapt file system operations to changing or unexpected performance characteristics that may be associated with network infrastructure components. For example, in some embodiments, file systems may be configured to route one or more particular file system operations (e.g., writes for particular users or client applications) to employ the highest performant network resources while other file system operations may be routed to lower performing (e.g., lower cost) resources. In some embodiments, in cloud computing environments or other environments where performance may be tied closely to price/costs, verification engines or component profiles may be employed to actively manage costs associated with operating file systems.

Also, in some embodiments, the availability of some features associated with verifying performance characteristics of network infrastructure for file systems may depend in part on the capabilities of the network infrastructure.

Figure 8:
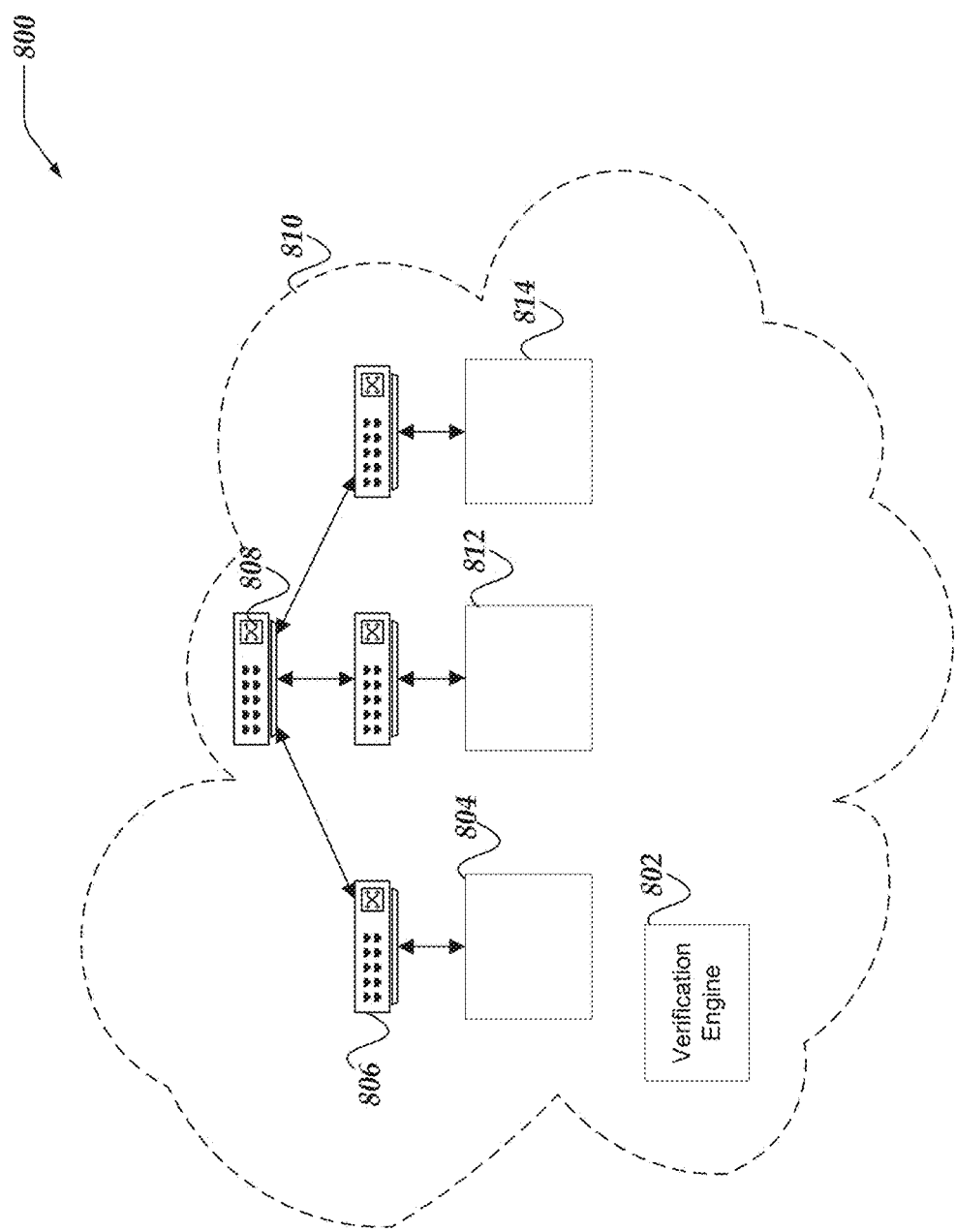
FIG. 8 illustrates a logical schematic for a file system for verifying performance characteristics of network infrastructure for file systems in accordance with one or more of the various embodiments.

FIG. 8 illustrates a logical schematic for file system 800 for verifying performance characteristics of network infrastructure for file systems in accordance with one or more of the various embodiments.

In some embodiments, verification engines may be arranged to automatically discover various characteristics of the network infrastructure associated with a file system.

In this example, file system 800 may include one or more verification engines, such as verification engine 802, file system node 804, file system node 812, file system node 814, network infrastructure components, such as network infrastructure component 806 or network infrastructure component 806, or the like. In this example, dashed line 810 may represent the boundaries of the relevant network infrastructure. Further, in some embodiments, as described above, file system nodes may be arranged to include onboard verification engines. Also, in some embodiments, verification engines may be hosted outside of file system node in a different computer. In this example, for some embodiments verification engine 802 is illustrated separate from the file system nodes. However, one of ordinary skill in the art will appreciate that verification engines may be hosted on file system nodes. In some embodiments, verification engines running on file system nodes designated as cluster controllers may communicate with verification engines on other file system node to collect information associated with particular file system nodes.

In some embodiments, verification engines may be arranged to execute discovery actions to determine the network infrastructure components, network devices, network computers, storage hardware, DNS information, gateways, network interfaces, networks, sub-networks, network addresses, MAC addresses, or the like, that may be comprise the network infrastructure that may be supporting the file system. Also, in some embodiments, verification engines may be arranged to integrate with configuration databases, LDAP servers, or the like, to determine information about the network infrastructure. Also, in some embodiments, verification engines may be arranged to query components or computers to collect information via SNMP or other conventional or custom discovery protocols.

Accordingly, in this example, verification engines, such as verification engine 802 may be arranged to discover information about the architecture of the network infrastructure. For example, in some embodiments, verification engine 802 may be arranged to examine various file system nodes, such as file system node 804, file system node 812, or file system node 814 to determine the make/model of the computer, its network interfaces, or the like. In some embodiments, on-board verification engines may be employed to collect information for file system nodes or network infrastructure components. For example, in some embodiments, verification engines running on file system nodes may collect locally available information from the operating system. Also, for example, some network infrastructure components may provide APIs that enable verification engines to collect information about those network infrastructure components. Also, in some embodiments, verification engines may be arranged to communicate with network monitoring components that may enable verification engines to discover additional network infrastructure components, utilization information, network activity information, or the like.

In some embodiments, verification engines may be arranged to collect the information into a data base that may enable the collected information to be used by test generators (described in more detail below), test suites, or the like.

Figure 9:
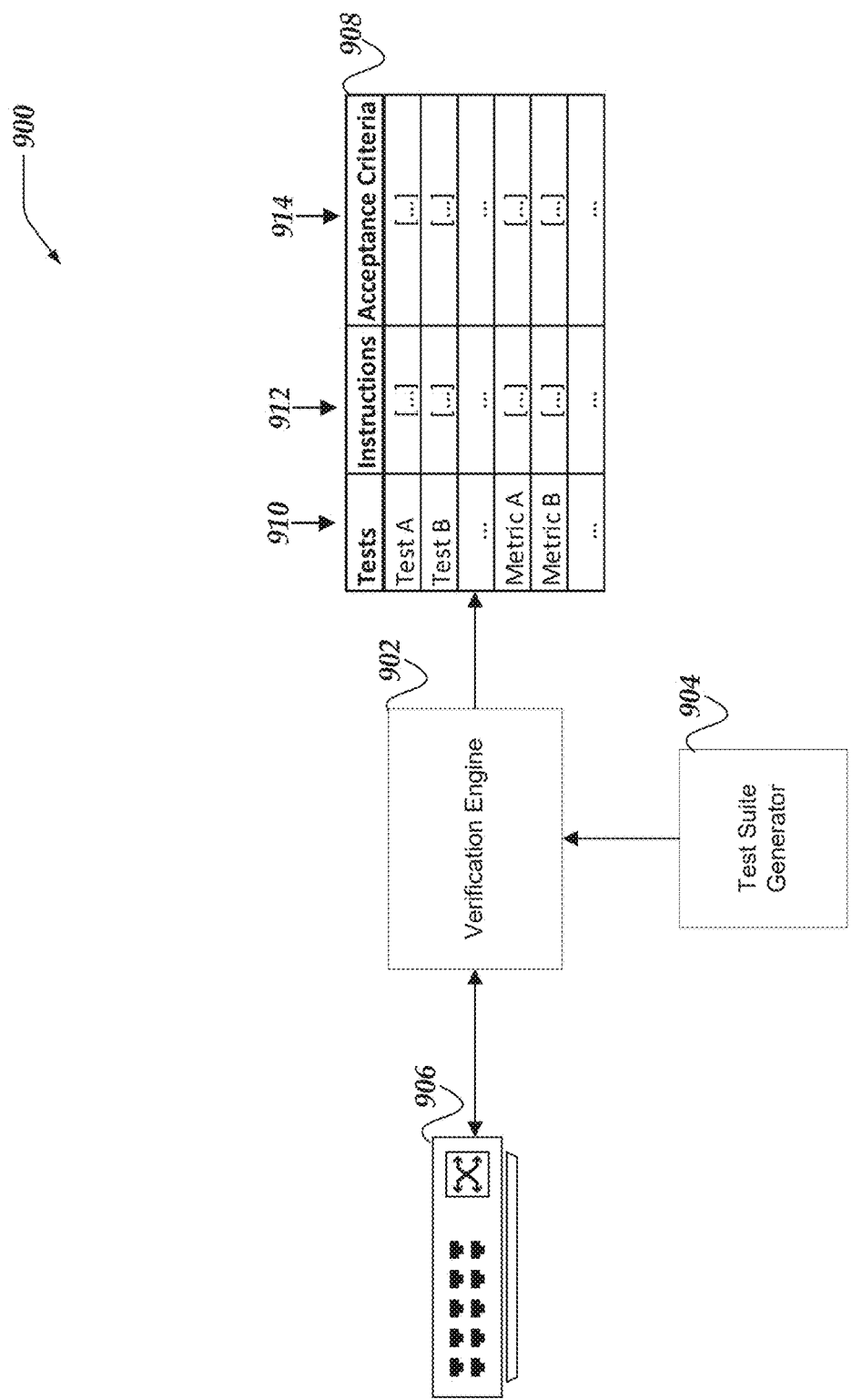
FIG. 9 illustrates a logical schematic for a system for verifying performance characteristics of network infrastructure for file systems in accordance with one or more of the various embodiments.

FIG. 9 illustrates a logical schematic for system 900 for verifying performance characteristics of network infrastructure for file systems in accordance with one or more of the various embodiments. In some embodiments, verification engines may be arranged to automatically generate one or more tests that may be used for verifying network infrastructure components.

Accordingly, in some embodiments, verification engines, such as verification engine 902 may be arranged to employ test suite generators, such as test suite generator 904 to automatically generate tests directed to components, such as switch 906 for including in test suites, such as test suite 908, or the like.

In some embodiments, test suites, such as test suite 908 may be considered data structures that include one or more tests (or references thereto) that may be employed to verify network infrastructure components. In some embodiments, test suite data structures may include one or more columns, such as column 910 for storing test identifiers, column 912 for storing instructions (or reference thereto) for executing the test, column 914 for storing acceptance criteria for the tests. Note, while for brevity and clarity test suite 908 is represented here using a table, one of ordinary skill in the art will appreciate that other data structures or formats may be used without departing from the scope of these innovations, including, JSON objects, lists, database tables, XML files, arrays, key value stores, or the like. Also, in some embodiments, instructions or acceptance criteria may be represented using one or more conventional or customized data definition languages, scripting languages, or the like. Accordingly, in some embodiments, verification engines may be arranged to be adaptable to different representations of tests, test instructions, acceptance criteria, or the like. Thus, in some embodiments, verification engines may be arranged process or represent tests based on rules, parsers, grammars, libraries, or the like, determined via configuration information to account for local circumstances or local requirements.

In some embodiments, test suite generators, such as, test suite generator may be arranged to select one or more tests for including in test suites. In some embodiments, tests may be based on templates, or the like. For example, test templates may be provided for a particular manufacture's components or component families. In some embodiments, test template fields or tests may be populated based on information included in SNMP MIBs or other device information. In some embodiments, manufacturers may provide test templates (or actual tests) for their components. For example, in some embodiments, some network infrastructure components may include one or more on-board tests or diagnostics that tests may be configured to activate or collect metrics from.

In some cases, for some embodiments, test suite generators may execute candidate tests to determine if the candidate tests may be compatible the with target components. In some embodiments, test suite generators may be arranged to employ generative AI or other tools to automatically interrogate APIs that may be used in tests. Accordingly, in some embodiments, test generators may be arranged to create one or more suites of coverage guided tests based on gathered network infrastructure characteristics or network data. In some embodiments, one or more tests may include: connectivity tests to the default gateways; DNS resolution tests; reachability tests to well-known cloud endpoints; synchronization tests with replication clusters; time synchronization tests with network time servers; network stability tests; bandwidth tests; latency tests; network packet loss tests; or the like.

Also, in some embodiments, test suite generators may include interactive user interfaces that enable users to select templates or tests for including in test suites. Further, in some embodiments, these user interfaces may enable users to assign acceptance criteria to one or more candidate tests. Also, in some embodiments, the user interfaces may enable users to provide instructions for manually created tests that may be included in test suites.

Figure 10:
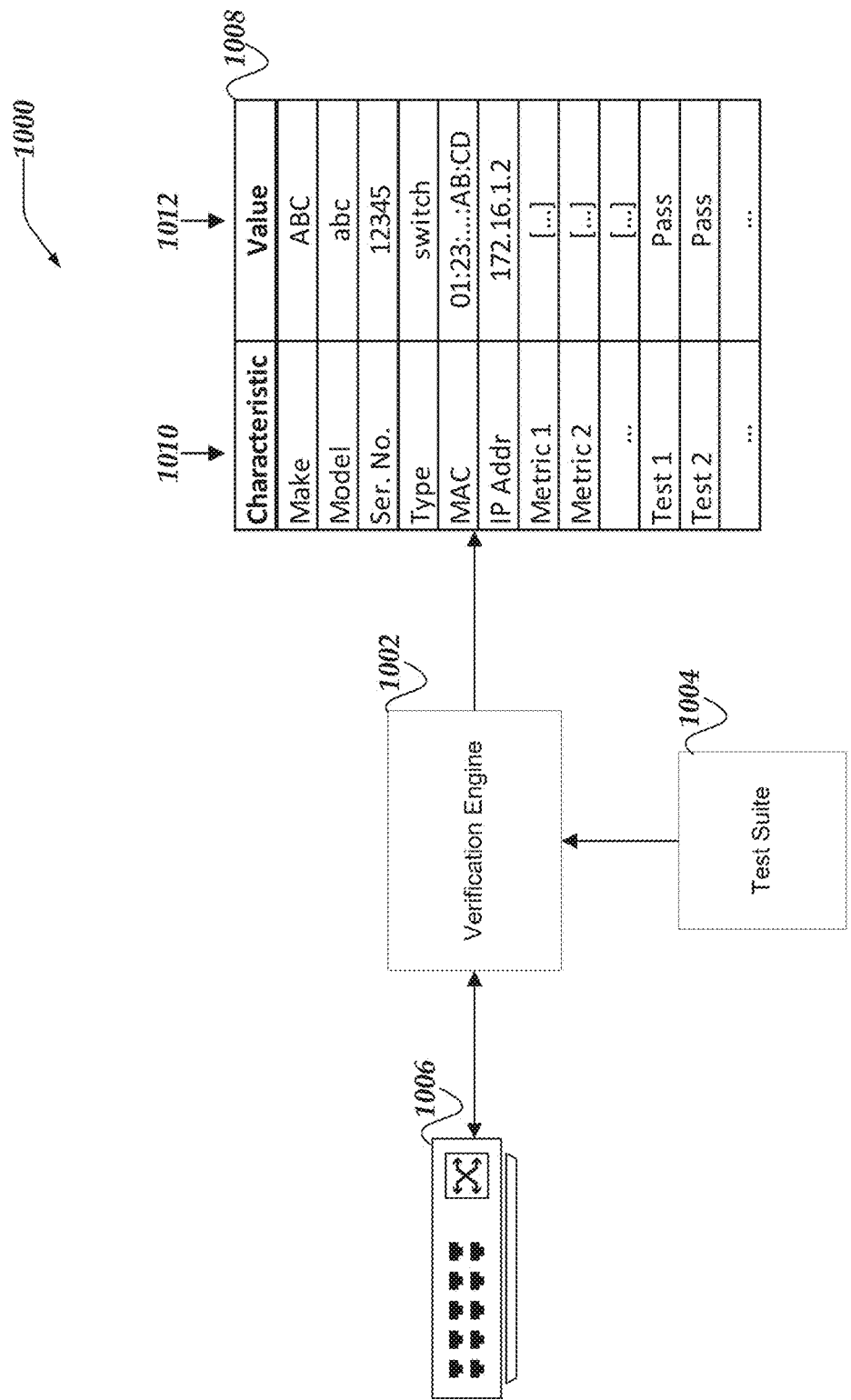
FIG. 10 illustrates a logical schematic for a system for verifying performance characteristics of network infrastructure for file systems in accordance with one or more of the various embodiments.

FIG. 10 illustrates a logical schematic for system 1000 for verifying performance characteristics of network infrastructure for file systems in accordance with one or more of the various embodiments. As described above, in some embodiments, verification engines may be arranged to execute one or more tests to discover or evaluate various characteristics of network infrastructure components that may impact the performance of file systems. Accordingly, in some embodiments, verification engines, such as verification engine 1002 may be arranged to employ one or more test suites, such as test suite 1004 for verifying network infrastructure components, such as switch 1006.

In some embodiments, verification engines may be arranged to generate component profiles, such as component profile 1008 based on one or more results from the execution of the test suites. In some embodiments, component profiles may be data structures the capture or otherwise represent various characteristics of the verified components. In this example, for some embodiments, column 1010 may represent field names for various characteristics while column 1012 may represent values associated with the characteristics. In some cases, for some embodiments, one or more field values may be empty or null-valued if they may not be relevant or discoverable for a particular component. Likewise, in some embodiments, the particular characteristic fields may vary depending on the component or component type.

In some embodiments, some of the characteristics, metrics, or associated values may be reported directly by the device or other supervisory components. For example, for some embodiments, a smart router may be configured to collect various metrics onboard, such that these metrics may be reported to the verification engine. Also, in some embodiments, a single switch may be configured report or record metrics for one or more individual network interfaces or network links that may employed to populate component profiles for the individual interfaces.

In one or more of the various embodiments, test suites, such as test suite 1004 may be data structures that include instructions, rules, or the like, for collecting metrics for component profiles. In some embodiments, test suites may include one or more template based test scripts that may be used to execute tests or collect metrics from particular components. Note, some instructions in test suites may be executing actual tests that report pass/fail results while other instructions may simply collect metric values. For brevity or clarity both of these species of instructions or others may be referred to herein as tests.

In some cases, test suites may include one or more tests (sub-tests) that may be bundled (or referenced) by a given test suite. In some cases, one or more tests may be usable across multiple components or component types. For example, a test may be shared across components that are known to support a standard information format, such as SNMP MIBs, or the like. While other particular tests may be used to submit specialized queries or specialized commands to components that may support proprietary protocols or APIs.

In some cases, for some embodiments, verification engines or test suites may be configured employ network infrastructure component handlers to enable communication with particular network infrastructure components.

Further, in some embodiments, component profiles, or the like, may be associated with some or all portions of the network infrastructure (e.g., sub-networks, VLANs, or the like) or some or all network infrastructure components. In some embodiments, verification engines may be arranged to maintain a map or index that associate determined or discovered network infrastructure components or network infrastructure portions with one or more tests or test suites. In some embodiments, component profiles may include references to associated tests or test suites. Accordingly, in some embodiments, verification engines may be arranged to determine network infrastructure components or network infrastructure portions that may be unassociated with a test or test suite based on such maps or indexes. Thus, in some embodiments, verification engines may be arranged to determine or track which network infrastructure components or network infrastructure portions may be uncovered by tests or test suites.

Further, in some embodiments, empty component profiles may be generated for untested network infrastructure. Accordingly, in some embodiments, verification engines may be enabled to determine or track network infrastructure that may not be covered by tests or test suites. For example, an empty component profile may include basic information, such as network address, MAC address, or other basic information, absent associated tests or test results. Accordingly, in this example, for some embodiments, verification engines may be enabled to determined which network infrastructure components or portions or network infrastructure may be uncovered or otherwise unassociated with tests or test suites.

Generalized Operations

FIGS. 11-15 represent generalized operations for verifying performance characteristics of network infrastructure for file systems in accordance with one or more of the various embodiments. In one or more of the various embodiments, processes 1100, 1200, 1300, 1400, or 1500 described in conjunction with FIGS. 11-15 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in cloud-based environments. However, embodiments are not so limited and various combinations of network computers, client computers, or the like may be utilized. Further, in one or more of the various embodiments, the processes described in conjunction with FIGS. 11-15 may perform one or more actions for verifying performance characteristics of network infrastructure for file systems in accordance with at least one of the various embodiments or architectures such as those described in conjunction with FIGS. 1-10. Further, in one or more of the various embodiments, some or all of the actions performed by processes 1100, 1200, 1300, 1400, or 1500 may be executed in part by one or more of file system engine 322, networking engine 324, infrastructure verification engine 326, or the like.

Figure 11:
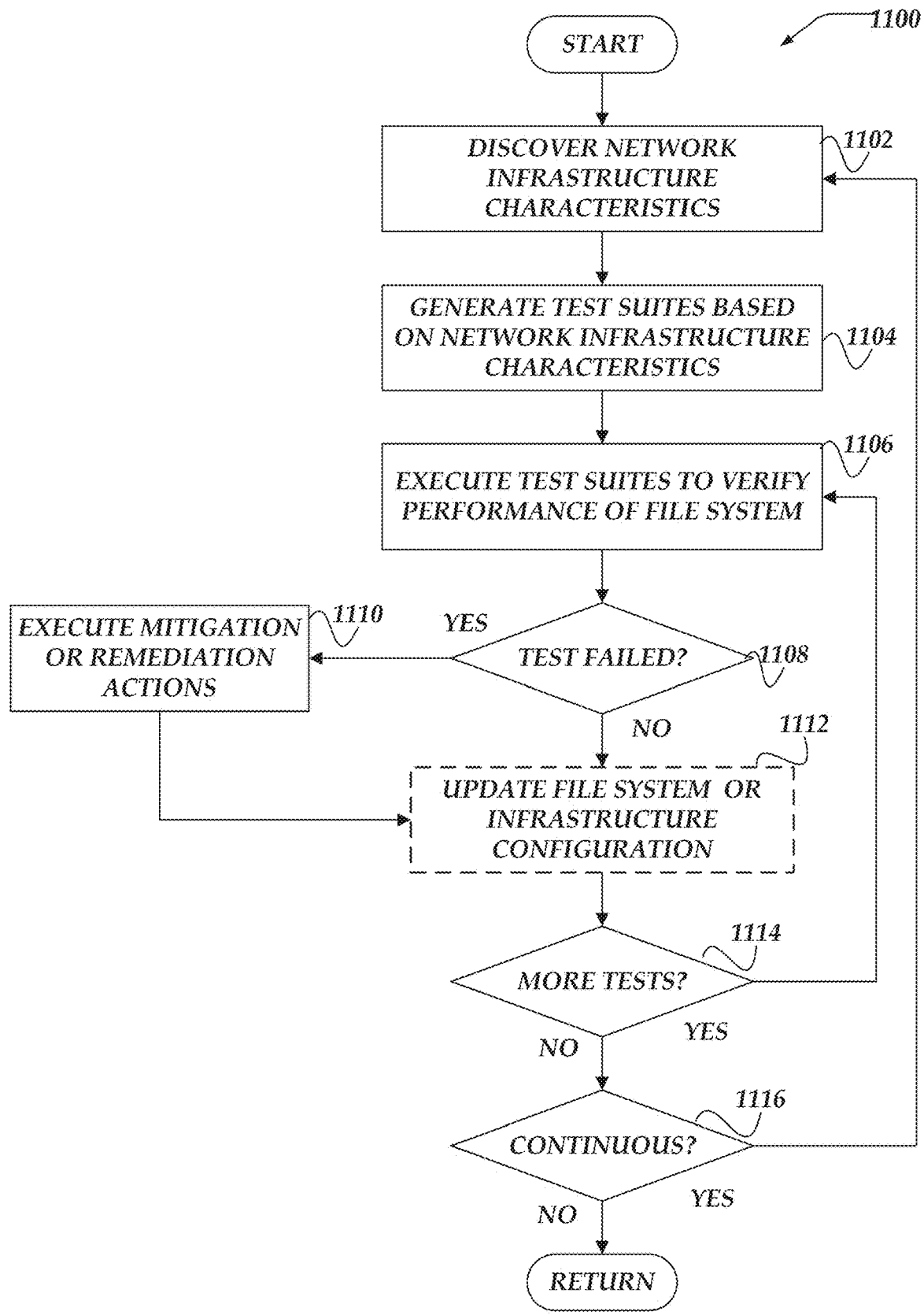
FIG. 11 illustrates an overview flowchart for a process for verifying performance characteristics of network infrastructure for file systems in accordance with one or more of the various embodiments.

FIG. 11 illustrates an overview flowchart for process 1100 for verifying performance characteristics of network infrastructure for file systems in accordance with one or more of the various embodiments. After a start flowchart block, at flowchart block 1102, in one or more of the various embodiments, verification engines may be arranged to discover the characteristics of network infrastructure associated with a file system. As described herein, in some embodiments, verification engines may be arranged to perform various actions to discover local network infrastructure or network infrastructure components. In some embodiments, probing network infrastructure components may include discovering the presence of particular network infrastructure components as well as determining the characteristics or features or the discovered network infrastructure components. In some cases, in some embodiments, verification engines may be arranged to manage or direct active or passive probing. Also, in some embodiments, verification engines may be arranged to integrate with other services, such as configuration databases or other network monitoring/discovery services.

Accordingly, in some embodiments, verification engines may be arranged to record the information about the network infrastructure or network infrastructure components in a data store.

At flowchart block 1104, in one or more of the various embodiments, verification engines may be arranged to generate one or more test suites based on the network infrastructure characteristics. In some embodiments, verification engines may be arranged to automatically generate one or more tests or one or more test suites (that may include one or more tests) based on the characteristics of the network infrastructure or one or more of the discovered network infrastructure components. In some embodiments, tests may be based on test templates, or the like. In some embodiments, verification engines may be arranged to generate generative AI prompts to automatically generate tests for particular network infrastructure components. In some embodiments, tests may be configured to employ communication protocols, APIs, or the like, that may enable network performance characteristics or network infrastructure components to be verified or evaluated. In some embodiments, test generation may include automatically validating candidate tests such that tests that fail to function (e.g., failure to execute the test) may be discarded or set aside for review.

At flowchart block 1106, in one or more of the various embodiments, verification engines may be arranged to execute test suites to verify performance of the file system. In some embodiments, verification engines may be arranged to generate one or more component profiles that may include the metrics, test results, characteristics, or the like, for network infrastructure components or one or more portions of the network infrastructure, such as sub-networks, VLANs, or the like.

In some embodiments, component profiles may be data structures that enable file system engines, networking engines, or verification engines to evaluate or verify the suitability of various network infrastructure components for one or more file system operations. Accordingly, in some embodiments, component profiles may be stored or otherwise made available file system engines, networking engines, verification engines, or the like.

At flowchart decision block 1108, in one or more of the various embodiments, if one or more tests fail control may flow to flowchart block 1110; otherwise, control may flow to flowchart block 1112.

In some embodiments, tests may include acceptance criteria such that a test may report if it passed or failed. Also, in some embodiments, some tests may collect metrics or performance information. In some cases, for some embodiments, metrics or performance information may be associated with acceptance criteria, such as that metrics that fail to meet the criteria may be considered failed test. Also, in some embodiments, some tests may simply collect metrics or performance information to enable other processes to evaluate the values. For example, in some embodiments, one or more tests may determine that various network interfaces may have different throughput, latency, or the like, such that file system engines may select the fastest available network interface for particular file system operations rather than "failing" the lower performing network interfaces based on their metrics.

Further, in some embodiments, tests or test suites may be associated with criticality or priority indicators that may dictate if a failed test should be considered a failure that requires immediate attention or otherwise. For example, in some embodiments, some tests with low criticality may generate information when they fail rather than alerts or notifications. In contrast, in some embodiments, other tests may result in network infrastructure components being disabled from being used for some or all file system operations.

At flowchart block 1110, in one or more of the various embodiments, verification engines may be arranged to execute mitigation of remediation actions. In some embodiments, the response to failed tests may depend on the particular test or test suite based on the importance of the test components or the criticality of the failed tests.

Accordingly, in some embodiments, verification engines may be arranged to associate various actions for responding to failed tests with particular tests, test suites, network infrastructure components, or the like. In some embodiments, verification engines may enable one or more scripts, rules, instructions, or the like, to be associated with particular tests, test suites, or network infrastructure components that may be executed in response to failed tests.

At flowchart block 1112, in one or more of the various embodiments, optionally, verification engines may be arranged to update the file system configuration or the network infrastructure configuration. In some embodiments, verifying performance characteristics of network infrastructure for file systems enables file system engines to be configured to direct particular file system operations to verified network infrastructure components based on the information collected during testing. In some cases, for some embodiments, some components may be excluded from particular file system operations based on failed tests. Also, in some embodiments, file system engines may be arranged to selectively employ particular network infrastructure components for particular file system operations based on metrics or other values that may be included in component profiles.

Also, in some embodiments, in response to test results, file system engines or networking engines may be configured to perform one or more actions to modify the configuration of the network infrastructure or one or more network infrastructure components.

Accordingly, in some embodiments, file system engines or networking engines may be arranged to associate various actions for modifying file system operations or network infrastructure configuration in response to failed tests. In some embodiments, one or more scripts, rules, instructions, or the like, may be associated with particular tests, test suites, or network infrastructure components to perform one or more modifications to file system configuration or network infrastructure configuration.

Note, this flowchart block is indicated as being optional because in some cases test results may not indicate that modifications need to be made.

At flowchart decision block 1114, in one or more of the various embodiments, if there may be more tests to perform, control may loop back to flowchart block 1106; otherwise, control may flow to flowchart decision block 1116.

In some embodiments, more than one test may be grouped into test suites. Accordingly, in some embodiments, verification engines may be arranged to execute one or more tests in sequence or in parallel to verify the performance characteristics of network infrastructure for file systems.

At flowchart decision block 1116, in one or more of the various embodiments, if the verification may be running continuously, control may loop back to flowchart block 1102; otherwise, control may be returned to a calling process.

In some cases, for some embodiments, verification engines may be arranged to enable users or file system administrators to selectively activate or initiate testing to verify the performance characteristics of network infrastructure for file systems.

Also, in some embodiments, verification engines may be configured to periodically or continuously execute one or more tests or test suites. Also, in some embodiments, some tests or test suites may be associated with particular file system operations or file system lifetime events. For example, some test suites may be configured to execute if new file system nodes may be added to a file system. Likewise, for example, some tests may be configured to execute if a file system may be coming online for the first time, or the like.

Figure 12:
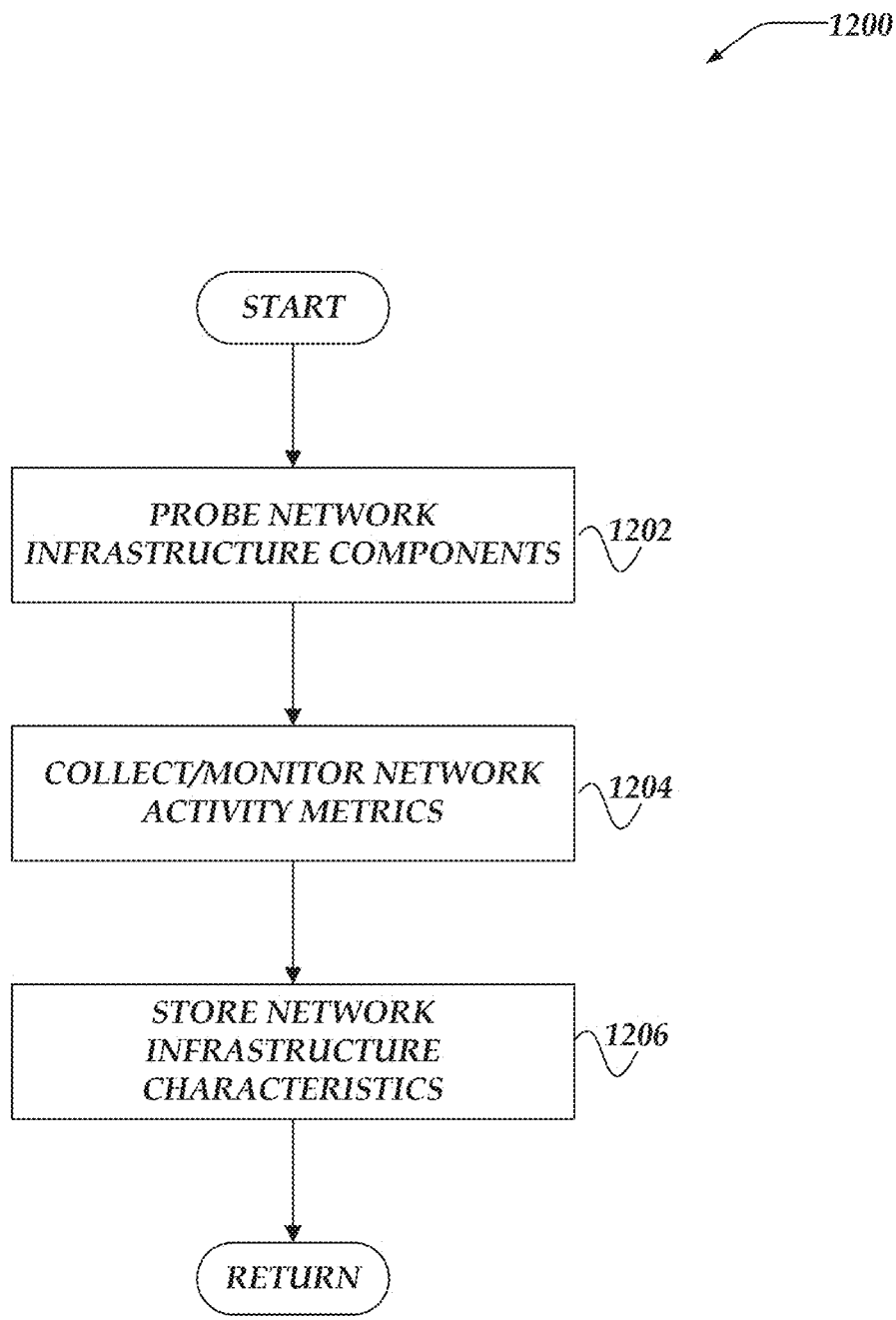
FIG. 12 illustrates a flowchart for a process for verifying performance characteristics of network infrastructure for file systems in accordance with one or more of the various embodiments.

FIG. 12 illustrates a flowchart for process 1200 for verifying performance characteristics of network infrastructure for file systems in accordance with one or more of the various embodiments. After a start flowchart block, at flowchart block 1202, in one or more of the various embodiments, verification engines may be arranged to interrogate/discover one or more network infrastructure components. In some embodiments, verification engines may be arranged to collect information about the network infrastructure that may be associated with file systems. In some embodiments, this may include actively probing one or more network infrastructure components that may be discovered or otherwise known to be part of the relevant network infrastructure.

In some cases, for some embodiments verification engines may be arranged to determine the presence of network infrastructure components based on interrogating local operating system configuration. For example, in some embodiments, operating system APIs or system calls may enable verification engines to determine default gateways, routing information, network interface characteristics, domain name service (DNS) information, or the like.

Accordingly, in some embodiments, information learned from the operating system may be followed up by direct interrogation/discovery actions or queries to confirm or explore the discovered components or services. In some cases, such probing may be somewhat generalized to particular network protocols, such executing ping commands, trace route commands, various operating system calls, or the like. Also, in some embodiments, verification engines may be arranged to scan various operating system or application level log/event repositories, such as event logs, system log files, file system logs, error logs, or the like, to determine network infrastructure components that may be relevant to file system operations.

Further, in some embodiments, verification engines may be arranged to integrate with configuration databases, or the like, to identify network infrastructure components. Accordingly, in some embodiments, verification engines may be arranged to submit one or more queries to configuration database to obtain information about the network infrastructure. Also, in some embodiments, verification engines may be provided with a list of probable or predicted network infrastructure components that may be found in relevant network infrastructure. Accordingly, in some embodiments, verification engines may be arranged to validate the existence of the probable or predicted network infrastructure components. For example, in some embodiments, verification engines may be provided a list of actions that may be executed to interrogate/discover the existence of particular network infrastructure components. In some embodiments, such actions may be declared using scripts, libraries, user interfaces, or the like, that may employ APIs or communication protocols that may be compatible with particular network infrastructure components.

Further, in some embodiments, verification engines may be arranged to integrate with network services or components that may be dedicated to discovering or monitoring which network infrastructure components may be operating in a network.

Accordingly, in some embodiments, verification engines may be arranged to merge information from one or more sources to generate a robust database of the relevant network infrastructure components.

In some embodiments, if network infrastructure components may be determined, verification engines may be arranged to execute subsequent probing actions to gather additional details regarding the particular network infrastructure components. In some cases, for some embodiments, this may include employing network infrastructure handlers to collecting information from individual network infrastructure components. For example, in some embodiments, if a network infrastructure component may be discovered, verification engines may execute additional queries or interrogation actions that employ APIs, schemas, protocols, or the like, directed to the particular components if they may be available.

In some embodiments, verification engines may be arranged to be adaptable to dynamic network environments. Accordingly, in some embodiments, verification engines may be arranged to employ rules, instructions, scripts, libraries, or the like, provided via configuration information to account for the introduction of new or different types of network infrastructure components into the network infrastructure. In some cases, in some embodiments, network infrastructure components handlers may be provided via configuration information to account for local circumstances.

In some embodiments, verification engines may be configured to continuously or periodically interrogate/discover network infrastructure components. Accordingly, in some embodiments, verification engines may be arranged to dynamically update its view of the relevant network infrastructure as changes may be made.

At flowchart block 1204, in one or more of the various embodiments, verification engines may be arranged to collect network activity metrics.

In some embodiments, as mentioned above, in some case, verification engines may be arranged to employ network traffic monitoring to discover network infrastructure components. However, in some embodiments, network monitoring may be employed to determine one or more characteristics of the networks or network activity that may be associated with (or impactful to) file system operations.

Accordingly, in some embodiments, verification engines may be arranged to monitor network traffic to determine relationships between different network infrastructure components and the file system. Also, in some embodiments, information gathered from network monitoring may be employed to evaluate the impact or performance requirements for particular file system clients, file system client types, various file system operations (e.g., recovery actions, replication actions, rebalancing operations, or the like), traffic distribution, or the like.

In some embodiments, verification engines may be arranged to integrate with one or more dedicated network monitoring services or devices to obtain some or all information associated with network activity.

At flowchart block 1206, in one or more of the various embodiments, verification engines may be arranged to store the network infrastructure characteristics.

In some embodiments, verification engines may be arranged to generate one or more data stores that may index or reference the determined network infrastructure components using network addresses, MAC addresses, component type (e.g., network interface, switch, hub, router, or the like), labels, manufacture, make/model, version, or the like. In some embodiments, the information about the network infrastructure may be stored using component profiles, or the like.

Likewise, in some embodiments, verification engines may be arranged to stores or index information associated network activity, client activity, file system operations, or the like, determined from the active or passive network monitoring.

Next, in one or more of the various embodiments, control may be returned to a calling process.

Figure 13:
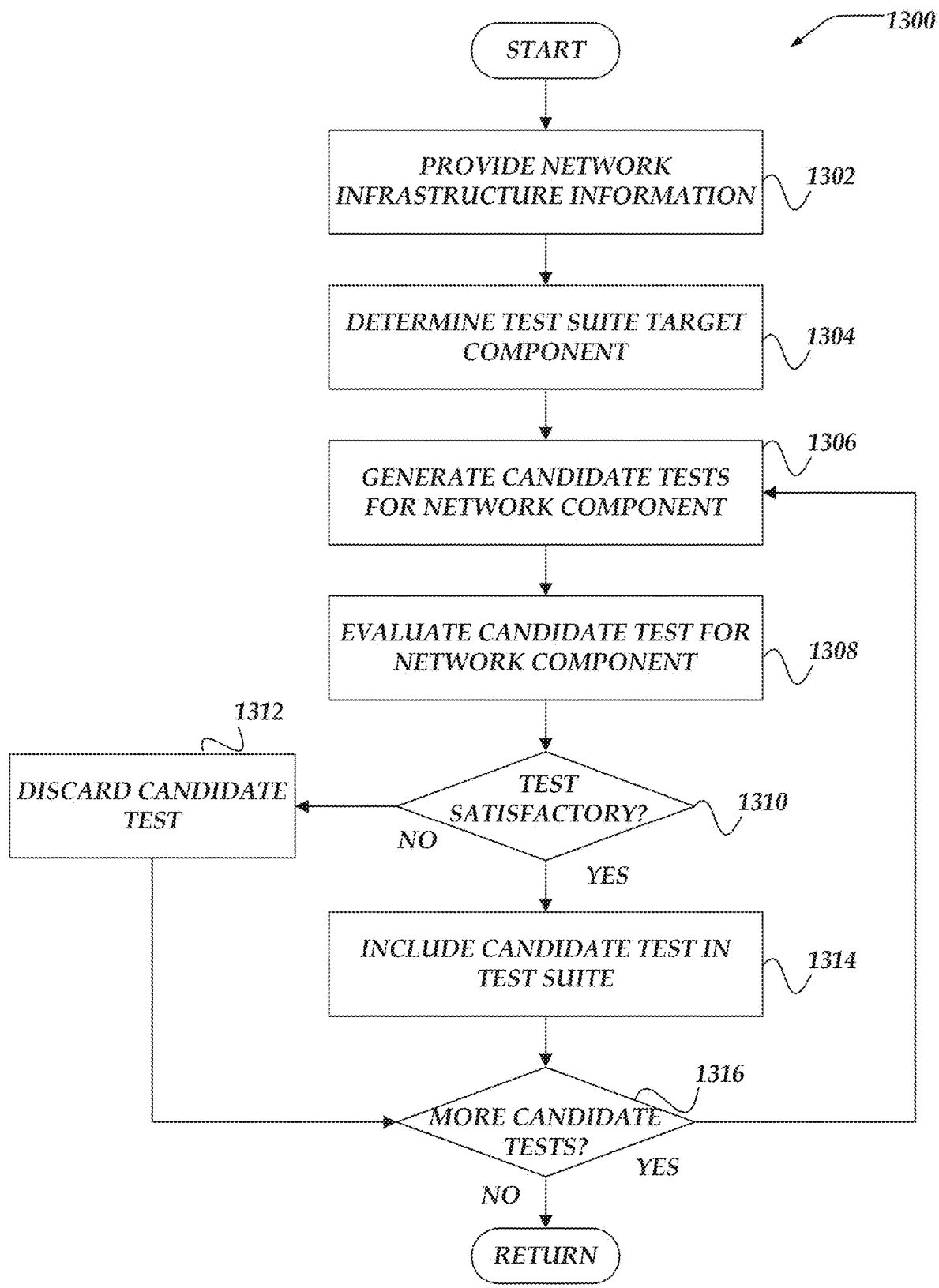
FIG. 13 illustrates a flowchart for a process for verifying performance characteristics of network infrastructure for file systems in accordance with one or more of the various embodiments.

FIG. 13 illustrates a flowchart for process 1300 for verifying performance characteristics of network infrastructure for file systems in accordance with one or more of the various embodiments. After a start flowchart block, at flowchart block 1302, in one or more of the various embodiments, verification engines may be arranged to provide network infrastructure information. As described above, in some embodiments, verification engines may be arranged to collect information about the characteristics of the network infrastructure associated with the file system. In some embodiments, characteristics of various network infrastructure components may be collected as well.

In some embodiments, verification engines may organize the network infrastructure information into profiles for each relevant network infrastructure component.

At flowchart block 1304, in one or more of the various embodiments, verification engines may be arranged to determine one or more test suite target network infrastructure components.

In some embodiments, test suites may be directed to one or more particular network infrastructure components, one or more classes of network components, network operating characteristics (e.g., latency, bandwidth, or the like), or the like. Accordingly, in some embodiments, verification engines may be arranged to employ a data structure that maps one or more network infrastructure portions or network infrastructure components to one or more test suites.

In some embodiments, verification engines may be configured to iterate over a predefined set of test suites that may be automatically applied against various network infrastructure components, such as verification engines may determine if the test suite may be applicable during the test generation process rather than pre-designating which test suite goes with which portion of the network infrastructure. For example, if none of the candidate tests generated for a test suite may be satisfactory or relevant that test suite may be discarded or ignored.

Also, in some embodiments, a given test suite may be directed to testing features or performance characteristics of the network infrastructure that involve or span two or more different network infrastructure components. For example, a test suite directed to evaluating network path capability may be configured to verify the performance characteristics of two or more different network infrastructure components, such as a one or more network interfaces, switches, routers, or the like, that may comprise the network path of interest. Also, in some embodiments, one or more test suites may be directed to individual network infrastructure components. For example, a test suite may be configured to verify individual network interfaces.

At flowchart block 1306, in one or more of the various embodiments, verification engines may be arranged to generate one or more candidate tests for the network infrastructure components.

In one or more of the various embodiments, as described above, test suites may be data structures that include or reference one or more test stems. In some embodiments, a new test suite may include a list of test stems for tests that should be generated or attempted to be generated for verifying the performance characteristics of the network infrastructure that the test suite may be targeting. In some embodiments, a test stem may be considered to be a data structure that includes or references test templates or other rules or instructions for generating candidate tests.

For example, in some embodiments, a test suite directed to generating tests for verifying the performance of file system nodes network interfaces may include instructions for generating tests to test for network connectivity, throughput, or the like, that may be common to network interfaces. Also, for example, for some embodiments, a test suite directed to verifying a network path between file system nodes and one or more network endpoints may be include test stems for verifying end-to-end latency, number of network hops to get to the target endpoint, verifying one or more intervening components (e.g., confirming that a firewall may be disposed between the terminating endpoint), or the like.

In some embodiments, verification engines may be arranged to generate tests from test stems by employing instructions, rules, or templates, or the like, that comprise the test stems. For example, in some embodiments, a template based test stem for a verifying performance characteristics of a particular network infrastructure component may include commands or instructions that have template fields or placeholders that may be automatically replaced to generate the candidate test. For example, a template test stem for verifying connectivity may include a placeholder where a network address of the target endpoint may be inserted. For example, in some embodiments, a test stem may include a template instruction such as "ping $ADDRESS" such that the $ADDRESS placeholder may be replaced with an actual network address of the target endpoint.

Similarly, in some embodiments, test stems may include templated acceptance criteria, such as "$TIME <$LATENCY_THRESHOLD_TIME? PASS: FAIL" where the verification engine may substitute values such as the time it takes for an operation to complete ($TIME) and acceptance value ($LATENCY_THRESHOLD_TIME) such that (in this example) the test may be considered to pass if the TIME value is less than LATENCY_THRESHOLD_TIME and to fail otherwise.

As described above, tests or test acceptance criteria may be declared using standard or customized computer languages, scripts, data definition languages, or the like, including referencing external libraries or APIs to interact with network infrastructure components. Accordingly, in some embodiments, verification engines may be arranged to employ compilers, parsers, grammars, or the like, provided via configuration information to generate candidate tests from test stems.

At flowchart block 1308, in one or more of the various embodiments, verification engines may be arranged to evaluate the one or more candidate tests. In some embodiments, verification engine may be arranged to evaluate candidate tests by various mechanisms, including validating compilers, validating tests against data definitions, XML Schema Definition (XSD) or Document Type Definition (DTD) for XML documents, running or compiling the test to determine if it produces the expected results, or the like. For example, if a candidate test employs an API call that is not supported by a target network infrastructure component, the test may fail to run as opposed to the component failing the test.

In some embodiments, verification engines may be arranged to generate instructions for validating candidate tests similar to how tests may be generated. Accordingly, in some embodiments, test stems may include instructions and acceptance criteria for validating candidate tests.

At flowchart decision block 1310, in one or more of the various embodiments, if the test may be satisfactory, control may flow to flowchart block 1314; otherwise, control may flow flowchart block 1312.

At flowchart block 1312, in some embodiments, verification engines may be arranged to discard unsatisfactory candidate tests. In some embodiments, some candidate tests may be considered mandatory such that failure to validate a candidate test may result in notifications, alerts, or the like. In some cases, a failure to validate may disqualifying an entire test suite. Accordingly, in some embodiments, the candidate test or the test suite may be unavailable or disabled absent user intervention to resolve the issues that caused the candidate test to be invalidated.

Also, in some embodiments, verification engines may be configured to discard invalid candidate tests and keep valid tests. For example, in some embodiments, a test suite may be designed to include several candidate tests where it may be expected that all or some of them may be invalid depending on the target component. In such cases, the invalid candidate tests may be discarded while the validated candidate tests may be retained.

In some embodiments, verification engines may be arranged to enable test stems for candidate tests to be indicated as mandatory or discardable. Accordingly, in some embodiments, if a mandatory candidate test is invalid, users may be notified to take action to correct the test or the test suite.

At flowchart block 1314, in one or more of the various embodiments, verification engines may be arranged to include the tests that pass in the test suite.

In some embodiments, validated candidate tests may be included in finalized test suites. In some embodiments, verification engines may be arranged to tag or otherwise indicate that the candidate test may be considered a valid test that may be employed for verifying performance characteristics of network infrastructure for file systems.

At flowchart decision block 1316, in one or more of the various embodiments, if there may be more candidate tests, control may loop back flowchart block 1306; otherwise, control may be returned to a calling process. As described above, in some embodiments, test suites may be associated with more than one test stem. Accordingly, in some embodiments, verification engines may be arranged to continue generating candidate tests until the test stems associated with a test suite have been addressed or until the test generation process has been halted because of the invalidation of a mandatory test.

Figure 14:
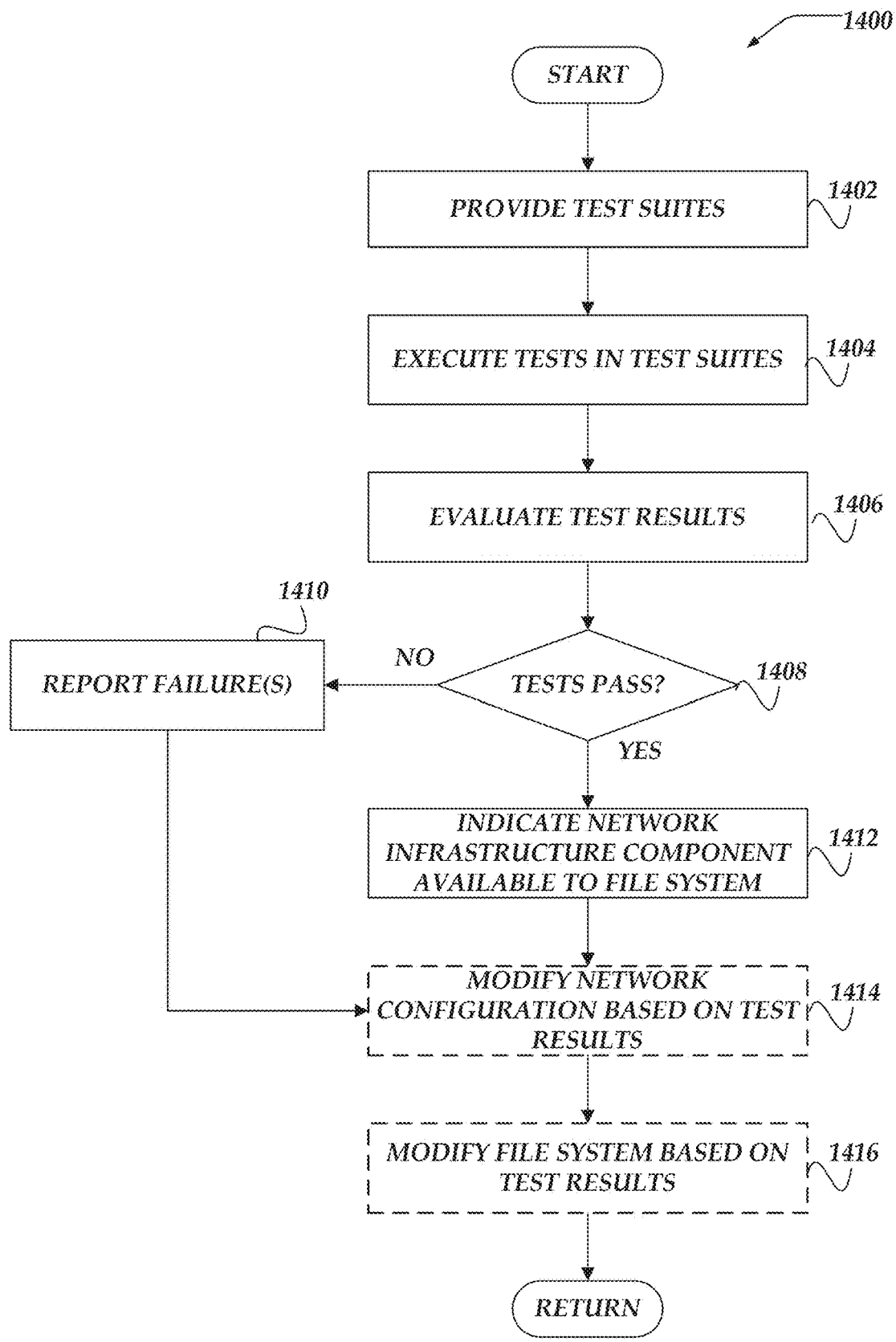
FIG. 14 illustrates a flowchart for a process for verifying performance characteristics of network infrastructure for file systems in accordance with one or more of the various embodiments.

FIG. 14 illustrates a flowchart for process 1400 for verifying performance characteristics of network infrastructure for file systems in accordance with one or more of the various embodiments. After a start flowchart block, at flowchart block 1402, in one or more of the various embodiments, verification engines may be arranged to provide one or more test suites. As described above, in some embodiments, verification engines may be arranged to generate one or more test suites that each may include in one or more tests. In some embodiments, verification engines may be arranged to store validated test suites in data stores. In some embodiments, verification engines may be arranged to schedule the execution of test suites to occur periodically, or on particular days/times. In some embodiments, one or more test suites may be designated to execute before particular file system operations or network activities, such as initializing/deploying new file systems, adding file system nodes to a file system cluster, or the like.

In some embodiments, different test suites may be associated with different run schedules. Also, in some embodiments, new or modified tests or test suites may be configured such that those tests or test suites may be given priority or executed immediately after being validated for production use.

In some embodiments, test suites may be data structures that include or reference one or more generated tests. Accordingly, in some embodiments, providing a test suite may result in one or more tests being executed.

At flowchart block 1404, in one or more of the various embodiments, verification engines may be arranged to execute one or more tests in the one or more test suites. In some embodiments, each test be a data structure that includes or references one or more of instructions, acceptance criteria, priority labels, criticality labels, or the like. In some embodiments, one or more test suites may be configured to execute particular tests in a declared order. Accordingly, in some embodiments, if a first test fails, verification engines may be enabled to stop executing the remained of the tests in the test suite. Also, in some embodiments, two or more tests in a test suite may be indicated as being suitable for parallel execution. Accordingly, in some embodiments, verification engines may be arranged to execute such tests at the same time. For example, if a test suite includes tests for verifying multiple network interfaces, a verification engine may be enabled to execute those tests in parallel.

Also, in some embodiments, given that more than one file system node may include verification engines, some test suites or tests may be executed simultaneous (or in parallel) by more than one file system node. In contrast, in some embodiments, tests associated with verifying cluster level characteristics may be executed by the current controller file system node a file system cluster.

In some cases, in some embodiments, tests may be arranged to gather information from network infrastructure components via APIs or protocols that enable smart components to report metrics or other data that may be collected by the component. For example, in some embodiments, if network infrastructure components track metrics, such as dropped packets, average connection duration, or the like, some tests may simply gather those metrics from the network infrastructure components.

In some embodiments, verification engines may be arranged to defer or suspend one or more tests or test suites if particular file system operations may occur. For example, while verification engines may be executing tests for a test suite, a critical file system operation may be initiated such that the verification engine pauses the tests until the critical operation has completed. Accordingly, in some embodiments, tests or test suites may be associated with one or more file system operations that may trigger suspension or deferment of the tests or test suites. Also, in some embodiments, one or more tests may be known to have little or no impact on file system operations such that they may be executed while critical file system operations may be occurring.

At flowchart block 1406, in one or more of the various embodiments, verification engines may be arranged to evaluate the results of the tests. In some embodiments, tests results may be collected and associated with each test suite or each test. In some embodiments, test results may include reports of which tests may have failed to operate/execute as well as results from tests the completed execution. For example, in some embodiments, tests that were validated during test generation may fail to execute at a later time because of current conditions of circumstances.

Also, in some embodiments, verification engines may be arranged to associate test results with the tested components. Accordingly, in some embodiments, verification engines may be arranged to archive test result history for network infrastructure components.

In some embodiments, each test may be associated with its particular acceptance criteria. For example, a test for confirming a working network connection may be pass or fail based on whether the endpoint of interest may be reached by pinging it, opening a connection, or the like. Also, for example, tests checking for particular metric values falling with a defined range may compare the relevant metrics value with a range of acceptable values. In some cases, for example, a test may trigger an onboard test on a network component. Accordingly, the results of the on-board test (e.g., pass/fail) may be evaluated even if the test executed by the verification engine performed without issue.

In some embodiments, acceptance criteria may be declared using conventional or custom imperative or declarative computer programming languages. Accordingly, in some embodiments, the criteria for passing a test may be expressed using one or more instructions, rules, or the like. Also, in some embodiments, a test may be configured to evaluate the results of one or more other tests. For example, in some embodiments, if test A and test B provide passing results, test C may fail if the results for test A and test B fail to meet a criteria, such as the two values being within a particular range of each other.

In some embodiments, verification engines may be arranged to collect the result for each test in a test result data structure that may enable the results of the complete test suite to evaluate together or in view of each other.

Also, in some embodiments, verification engines may be arranged to enable one or more tests or test suites to be indicated as being informational. Accordingly, in some embodiments, they may be executed to collect information or status information that may not be an operational requirement. In some embodiments, such tests may be considered to pass as long as they successfully executed and collected the desired information.

Also, in some embodiments, some tests may be indicated as being able to fail without concern such that there may be value in observing the results of the test without triggering an mitigation response. For example, if a network infrastructure component includes two or more redundant on-board temperature sensors, the failure (or non-responsiveness) of one sensor may not trigger active mitigation.

Also, in some embodiments, verification engines may be arranged to enable one or more tests to be associated with criticality codes or priority codes such that the evaluations of test results may include filters based on such codes. For example, if a test has a criticality code of DEBUG, failing it may not trigger a mitigation action, unless the file system may be operated in a debug mode. In contrast, in some embodiments, a test associated with a criticality code of CRITICAL may always trigger mitigation actions upon failure.

At flowchart decision block 1408, in one or more of the various embodiments, if the tests pass, control may flow to flowchart block 1412; otherwise, control may flow flowchart block 1410.

In some embodiments, the evaluation of test results or test suites may indicate a no-pass condition. Note, as mentioned above, in some embodiments, some tests may fail without creating a no-pass condition. In some embodiments, such test results may be considered informational rather than related to operations or performance.

At flowchart block 1410, in one or more of the various embodiments, verification engines may be arranged to report the test failures.

In some embodiments, verification engines may be arranged to generate notifications, alerts, log entries, or the like, based on the tests that failed. In some embodiments, individual tests or test suites may be associated with criticality codes, or the like, that may influence the type of notification, incident responses, trouble ticket escalation, or the like. Likewise, in some embodiments, verification engines may enable tests or test suites to be associated with escalation policies. Further, in some embodiments, verification engines may be arranged to integrate with external trouble-ticketing systems, incident management systems, or the like, that may be employed to manage failed tests.

At flowchart block 1412, in one or more of the various embodiments, verification engines may be arranged to indicate network infrastructure components available to file system. In some embodiments, as described herein, tests or test suites may be directed to one or more particular network infrastructure components. Accordingly, in some embodiments, components associated with tests that pass may be indicated as verified for file system operations.

In some embodiments, verification engines may be arranged to assign grades or performance scores to network infrastructure components based on the associated test results. In some embodiments, test results may be employed to categorize or classify network infrastructure components based on one or more performance characteristics. For example, in some embodiments, network interfaces, or the like, may be assigned grades, such as A, B, or C based on the results of particular tests (e.g., proven bandwidth, or the like) such that particular file system operations may be allocated to particular network interfaces based on the performance grades associated with the particular network interface.

Note, in some embodiments, test results may be employed to verify or other confirm that network infrastructure components actually perform to the level of their advertised specifications. Similarly, in some embodiments, test results may characterize the actual performance characteristics of network infrastructure components where the specifications indicate a range of values.

At flowchart block 1414, in one or more of the various embodiments, optionally, networking engines may be arranged to modify one or more portions of the network infrastructure configuration based on test results.

In some embodiments, networking engines may be arranged to monitor test results to determine if one or more network configuration changes should be made. For example, for some embodiments, if there may be more than network interfaces, networking engines may be arranged to select network interfaces to associated with file system nodes based on the test results. In some cases, this may include: routing around failed/disabled network infrastructure components; selecting more performant network infrastructure components for critical file system operations; reserving portion of the network or network infrastructure for particular file system operations; or the like.

Note, this flowchart block is indicated as being optional because in some cases, the test results may not indicate that modifications to the network infrastructure may be required.

At flowchart block 1416, in one or more of the various embodiments, optionally, file system engines may be arranged to modify the file system configuration based on the test results. In some embodiments, one or more file system operation handlers may be configured to monitor the results for one or more particular tests. Accordingly, in some embodiments, file system operations may be configured to trigger one or more modifications to file system configuration based on particular test result. For example, during periods of degraded network performance, file system operations may be modified to ensure critical operations may be performed. Also, for example, if data protection guarantees may be threatened by degraded or disabled network infrastructure components, file system engines may prioritize re-striping, rebalancing, data recovery, or the like, until the threats to data protection guarantees may be alleviated.

Further, in some embodiments, modifications to file system operations may include pinning particular file system operations for particular clients or users to particular network infrastructure components, network paths, or the like.

Note, this flowchart block is indicated as being optional because in some cases, the test results may not indicate that modifications to the file system may be required.

Next, in one or more of the various embodiments, control may be returned to a calling process.

Figure 15:
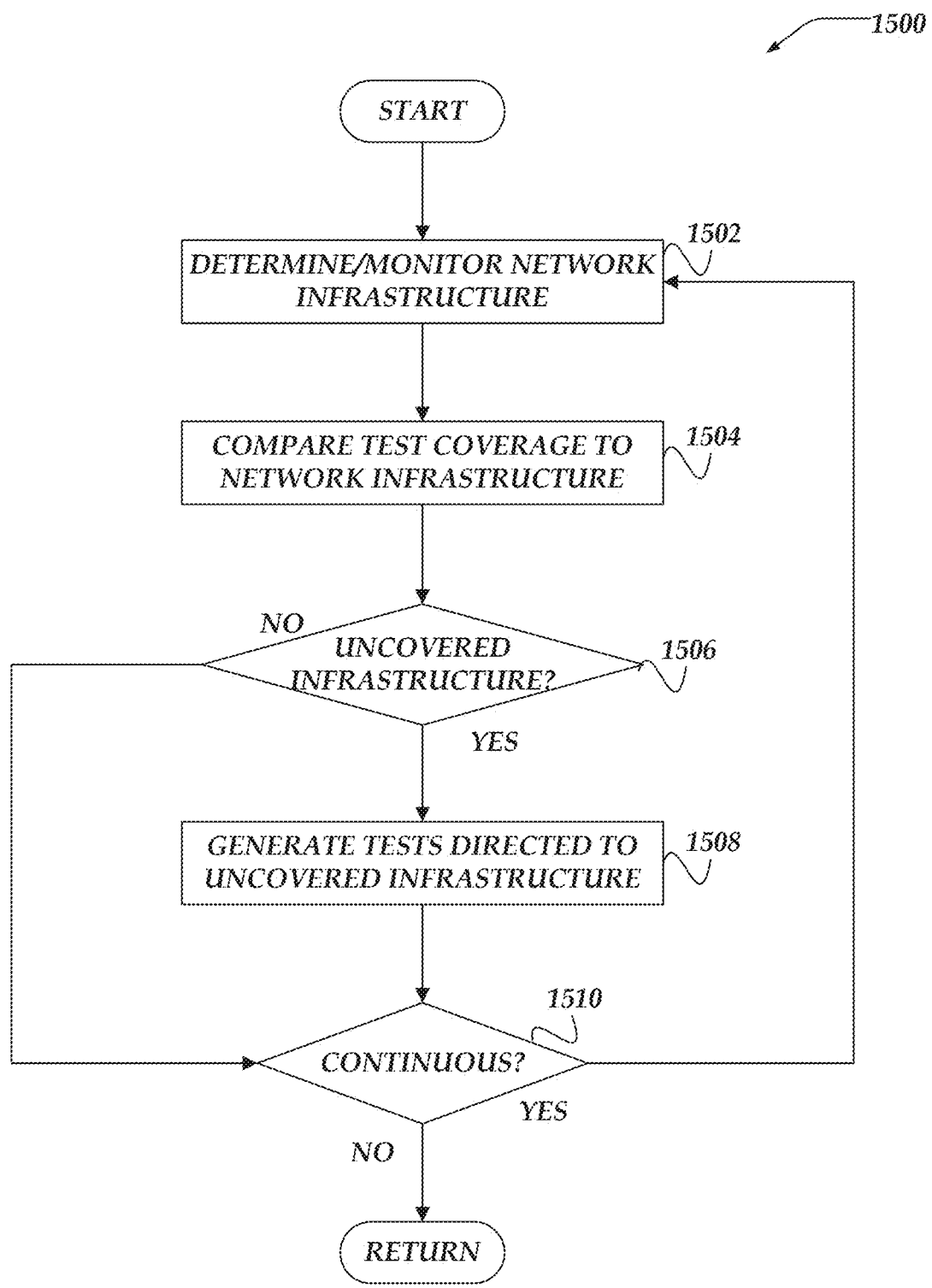
FIG. 15 illustrates a flowchart for a process for verifying performance characteristics of network infrastructure for file systems in accordance with one or more of the various embodiments.

FIG. 15 illustrates a flowchart for process 1500 for verifying performance characteristics of network infrastructure for file systems in accordance with one or more of the various embodiments. After a start flowchart block, at flowchart block 1502, in one or more of the various embodiments, as described above, verification engines may be arranged to actively or passively perform actions to determine the network infrastructure associated with file systems. Accordingly, in some embodiments, verification engines may be arranged to perform various actions as described above to identity network infrastructure components, characterize network infrastructure components, determine various performance metrics, or the like, to verify the performance characteristics of the network infrastructure.

At flowchart block 1504, in one or more of the various embodiments, verification engines may be arranged to compare the test coverage associated with current available tests to the determined network infrastructure. As described above, in some embodiments, verification engines may be arranged to generate component profiles for network infrastructure components or portions of network infrastructure that may be discovered. Accordingly, in some embodiments, verification engines may be arranged to associate tests or test suites with particular network infrastructure components or network infrastructure portions. In some embodiments, verification engines may determine components or network infrastructure portions that may not be associated with tests or test suites may be uncovered by tests or test suites. Also, in some embodiments, verification engines may be arranged to determine network infrastructure that may be uncovered by tests based on the determination of network infrastructure components or network infrastructure portions that may not be associated with a component profile.

At flowchart decision block 1506, in one or more of the various embodiments, if there may be one or more portions of the network infrastructure or one or more network infrastructure components that may be uncovered by tests, control may flow to flowchart block 1508; otherwise, control may flow to flowchart decision block 1510.

In some embodiments, uncovered network infrastructure may be considered to be network infrastructure components or network infrastructure portions unassociated with a test or test suite. Likewise, in some embodiments, network infrastructure components or network infrastructure portions unassociated with a component profile may be considered uncovered.

At flowchart block 1508, in one or more of the various embodiments, verification engines may be arranged to generate one or more tests or test suites for the uncovered network infrastructure components or network infrastructure portions. As described above, in some embodiments, verification engines may be arranged to automatically generate tests or test suites for the uncovered network infrastructure components or uncovered network infrastructure portions.

In some embodiments, if valid tests or valid test suites may be generated, the component profiles of the uncovered network infrastructure components or network infrastructure portions may be updated to indicate the association with the generated tests or test suites.

In some cases, in some embodiments, the determined/discovered network infrastructure may be such that user intervention may be required to generate the appropriate tests. For example, in some embodiments, verification engines may discover one or more new network infrastructure components that it may not recognize. Also, for example, in some cases, some discovered components may require specialized component handlers, rules, API integration, or instructions, to enable automated testing or test generation. Accordingly, in some embodiments, if such network infrastructure components or network infrastructure portions may be determined, verification engines may be arranged to generate notifications, alerts, reports, or the like, to relate that the determined network infrastructure components or network infrastructure portions may require user intervention to enable automated testing.

At flowchart decision block 1508, in one or more of the various embodiments, if test coverage verification may be running continuously, control may loop back to flowchart block 1510; otherwise, control may be returned to a calling process.

In some cases, for some embodiments, verification engines may be arranged to enable users or file system administrators to selectively activate or initiate test coverage monitoring.

Also, in some embodiments, verification engines may be configured to periodically or continuously execute test coverage monitoring.

It will be understood that each flowchart block in each flowchart illustration, and combinations of flowchart blocks in each flowchart illustration, can be implemented by computer program instructions. These program instructions may be provided to a processor to produce a machine, such that the instructions, which execute on the processor, create means for implementing the actions specified in each flowchart block or flowchart blocks. The computer program instructions may be executed by a processor to cause a series of operational steps to be performed by the processor to produce a computer-implemented process such that the instructions, which execute on the processor, provide steps for implementing the actions specified in each flowchart block or flowchart blocks. The computer program instructions may also cause at least some of the operational steps shown in the flowchart blocks of each flowchart to be performed in parallel. Moreover, some of the steps may also be performed across more than one processor, such as might arise in a multi-processor computer system. In addition, one or more flowchart blocks or combinations of flowchart blocks in each flowchart illustration may also be performed concurrently with other flowchart blocks or combinations of flowchart blocks, or even in a different sequence than illustrated without departing from the scope or spirit of the invention.

Accordingly, each flowchart block in each flowchart illustration supports combinations of means for performing the specified actions, combinations of steps for performing the specified actions and program instruction means for performing the specified actions. It will also be understood that each flowchart block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors to execute instructions that are configured to cause performance of actions, comprising:
    executing a plurality of file system operations in the file system based on one or more of a file system client action or a file system administrative action, wherein the file system is integrated with a network infrastructure that includes a plurality of network devices;
    determining one or more characteristics of the plurality network devices in the network infrastructure that are associated with the file system based on one or more discovery operations;
    generating one or more interactive user interfaces for one or more users to select one or more of a test template, a test instruction or a test criteria, wherein the one or more interactive user interfaces employ geolocation information for generation of one or more localization features that include one or more of a time zone, a natural language, a currency, a calendar format;
    generating one or more tests based on the one or more of the selected test template, the test instruction, the test criteria or the characteristics of the plurality of network devices, wherein the one or more tests are executed to evaluate the plurality of network devices, and wherein execution of the one or more tests causes performance of further actions, including:
        determining one or more test stems associated with one or more target network devices of the plurality of network devices, wherein the one or more test stems include one or more template fields;
        generating one or more candidate tests based on populating the one or more template fields with the one or more characteristics of the one or more target network devices, wherein the one or more characteristics include one or more of a network address, a MAC address, or an application programmer interface (API) parameter; and
        validating the one or more candidate tests based on the one or more target network devices, wherein each invalid candidate test is discarded; and
    employing one or more results of the one or more tests to perform further actions, including:
        determining one or more non-compliant network devices of the plurality of network devices based on the one or more results; and
        modifying the network infrastructure based on the one or more non-compliant network devices, wherein one or more of the plurality of file system operations are modified based on the one or more non-compliant network devices; and
    executing the one or more modified file system operations on the modified network infrastructure.

2. The method of claim 1, further comprising:
    determining one or more features of the network infrastructure based on real-time monitoring of network activity in the network infrastructure, wherein the one or more features include one or more of a default gateway, a domain name service server, a cloud endpoint, a file system replication cluster, or a time service; and
    determining one or more characteristics of one or more portions of the network infrastructure based on the one or more features, wherein the one or more portions of the network infrastructure include one or more of a sub-network, a virtual local area network (VLAN), or a path from a network endpoint in the file system to a target network endpoint.

3. The method of claim 1, wherein the one or more discovery operations, further comprise:
executing one or more actions to interrogate the plurality of network devices based on one or more of an application programmer interface (API), a schema, a library, or a protocol; and
determining the one or more characteristics of the plurality of network devices based on the interrogation, wherein the plurality of network devices include one or more of a network interface, a network switch, a hub, a network bridge, a router, an access point, a load balancer, a modem, a gateway, or a firewall.

4. The method of claim 1, further comprising:
determining one or more untested network devices or one or more untested portions of the network infrastructure that are unassociated with a test based on a comparison of the one or more tests with the plurality of network devices and the network infrastructure; and
generating one or more other tests based on the one or more untested network devices or the one or more untested portions of the infrastructure, wherein the one or more other tests are executed to evaluate the one or more untested network devices or the one or more untested portions of the infrastructure.

5. The method of claim 1, wherein the one or more tests include one or more of a connectivity test, a domain name service (DNS) resolution test, an endpoint reachability test, a replication synchronization test, a quality of service test, a network stability test, a bandwidth test, a latency test, a network packet loss test, or a time synchronization test.

6. The method of claim 1, wherein executing the plurality of file system operations, further comprises:
executing one or more of a file system client request, a file system backup operation, a file system recovery operation, a replication operation, a meta-data update operation, a snapshot operation, a data protection operation, or a rebalancing operation.

7. The method of claim 1, further comprising:
determining the plurality of network devices based on one or more of a configuration database, a system log file, a network monitoring service, or an event log.

8. A system for managing data in a file system over a network, comprising:
a network computer, comprising:
a memory that stores at least instructions; and
one or more processors that execute instructions that are configured to cause performance of actions, including:
executing a plurality of file system operations in the file system based on one or more of a file system client action or a file system administrative action, wherein the file system is integrated with a network infrastructure that includes a plurality of network devices;
determining one or more characteristics of the plurality network devices in the network infrastructure that are associated with the file system based on one or more discovery operations;
generating one or more interactive user interfaces for one or more users to select one or more of a test template, a test instruction or a test criteria, wherein the one or more interactive user interfaces employ geolocation information for generation of one or more localization features that include one or more of a time zone, a natural language, a currency, a calendar format;
generating one or more tests based on the one or more of the selected test template, the test instruction, the test criteria or the characteristics of the plurality of network devices, wherein the one or more tests are executed to evaluate the plurality of network devices, and wherein execution of the one or more tests causes performance of further actions, including:
determining one or more test stems associated with one or more target network devices of the plurality of network devices, wherein the one or more test stems include one or more template fields;
generating one or more candidate tests based on populating the one or more template fields with the one or more characteristics of the one or more target network devices, wherein the one or more characteristics include one or more of a network address, a MAC address, or an application programmer interface (API) parameter; and
validating the one or more candidate tests based on the one or more target network devices, wherein each invalid candidate test is discarded; and
employing one or more results of the one or more tests to perform further actions, including:
determining one or more non-compliant network devices of the plurality of network devices based on the one or more results; and
modifying the network infrastructure based on the one or more non-compliant network devices, wherein one or more of the plurality of file system operations are modified based on the one or more non-compliant network devices; and
executing the one or more modified file system operations on the modified network infrastructure; and
one or more client computers, comprising:
a memory that stores at least instructions; and
one or more processors that execute instructions that are configured to cause performance of other actions, including:
communicating one or more requests to initiate one or more file system operations.

9. The system of claim 8, wherein the one or more network computer processors execute instructions that are configured to cause performance of actions, further comprising:
determining one or more features of the network infrastructure based on real-time monitoring of network activity in the network infrastructure, wherein the one or more features include one or more of a default gateway, a domain name service server, a cloud endpoint, a file system replication cluster, or a time service; and
determining one or more characteristics of one or more portions of the network infrastructure based on the one or more features, wherein the one or more portions of the network infrastructure include one or more of a sub-network, a virtual local area network (VLAN), or a path from a network endpoint in the file system to a target network endpoint.

10. The system of claim 8, wherein the one or more discovery operations, further comprise:
  executing one or more actions to interrogate the plurality of network devices based on one or more of an application programmer interface (API), a schema, a library, or a protocol; and
  determining the one or more characteristics of the plurality of network devices based on the interrogation, wherein the plurality of network devices include one or more of a network interface, a network switch, a hub, a network bridge, a router, an access point, a load balancer, a modem, a gateway, or a firewall.

11. The system of claim 8, wherein the one or more network computer processors execute instructions that are configured to cause performance of actions, further comprising:
  determining one or more untested network devices or one or more untested portions of the network infrastructure that are unassociated with a test based on a comparison of the one or more tests with the plurality of network devices and the network infrastructure; and
  generating one or more other tests based on the one or more untested network devices or the one or more untested portions of the infrastructure, wherein the one or more other tests are executed to evaluate the one or more untested network devices or the one or more untested portions of the infrastructure.

12. The system of claim 8, wherein the one or more tests include one or more of a connectivity test, a domain name service (DNS) resolution test, an endpoint reachability test, a replication synchronization test, a quality of service test, a network stability test, a bandwidth test, a latency test, a network packet loss test, or a time synchronization test.

13. The system of claim 8, wherein executing the plurality of file system operations, further comprises:
  executing one or more of a file system client request, a file system backup operation, a file system recovery operation, a replication operation, a meta-data update operation, a snapshot operation, a data protection operation, or a rebalancing operation.

14. The system of claim 8, wherein the one or more network computer processors execute instructions that are configured to cause performance of actions, further comprising:
  determining the plurality of network devices based on one or more of a configuration database, a system log file, a network monitoring service, or an event log.

15. A processor readable non-transitory storage media that includes instructions for managing data in a file system over a network, wherein execution of the instructions by one or more processors on one or more network computers performs actions, comprising:
  executing a plurality of file system operations in the file system based on one or more of a file system client action or a file system administrative action, wherein the file system is integrated with a network infrastructure that includes a plurality of network devices;
  determining one or more characteristics of the plurality network devices in the network infrastructure that are associated with the file system based on one or more discovery operations;
  generating one or more interactive user interfaces for one or more users to select one or more of a test template, a test instruction or a test criteria, wherein the one or more interactive user interfaces employ geolocation information for generation of one or more localization features that include one or more of a time zone, a natural language, a currency, a calendar format;
  generating one or more tests based on the one or more of the selected test template, the test instruction, the test criteria or the characteristics of the plurality of network devices, wherein the one or more tests are executed to evaluate the plurality of network devices, and wherein execution of the one or more tests causes performance of further actions, including:
    determining one or more test stems associated with one or more target network devices of the plurality of network devices, wherein the one or more test stems include one or more template fields;
    generating one or more candidate tests based on populating the one or more template fields with the one or more characteristics of the one or more target network devices, wherein the one or more characteristics include one or more of a network address, a MAC address, or an application programmer interface (API) parameter; and
    validating the one or more candidate tests based on the one or more target network devices, wherein each invalid candidate test is discarded; and
  employing one or more results of the one or more tests to perform further actions, including:
    determining one or more non-compliant network devices of the plurality of network devices based on the one or more results; and
    modifying the network infrastructure based on the one or more non-compliant network devices, wherein one or more of the plurality of file system operations are modified based on the one or more non-compliant network devices; and
  executing the one or more modified file system operations on the modified network infrastructure.

16. The media of claim 15, further comprising:
  determining one or more features of the network infrastructure based on real-time monitoring of network activity in the network infrastructure, wherein the one or more features include one or more of a default gateway, a domain name service server, a cloud endpoint, a file system replication cluster, or a time service; and
  determining one or more characteristics of one or more portions of the network infrastructure based on the one or more features, wherein the one or more portions of the network infrastructure include one or more of a sub-network, a virtual local area network (VLAN), or a path from a network endpoint in the file system to a target network endpoint.

17. The media of claim 15, wherein the one or more discovery operations, further comprise:
  executing one or more actions to interrogate the plurality of network devices based on one or more of an application programmer interface (API), a schema, a library, or a protocol; and
  determining the one or more characteristics of the plurality of network devices based on the interrogation, wherein the plurality of network devices include one or more of a network interface, a network switch, a hub, a network bridge, a router, an access point, a load balancer, a modem, a gateway, or a firewall.

18. The media of claim 15, further comprising:
  determining one or more untested network devices or one or more untested portions of the network infrastructure that are unassociated with a test based on a comparison of the one or more tests with the plurality of network devices and the network infrastructure; and generating one or more other tests based on the one or more untested network devices or the one or more untested portions of the infrastructure, wherein the one or more other tests are executed to evaluate the one or more untested network devices or the one or more untested portions of the infrastructure.

19. The media of claim 15, wherein the one or more tests include one or more of a connectivity test, a domain name service (DNS) resolution test, an endpoint reachability test, a replication synchronization test, a quality of service test, a network stability test, a bandwidth test, a latency test, a network packet loss test, or a time synchronization test.

20. The media of claim 15, further comprising:
    determining the plurality of network devices based on one or more of a configuration database, a system log file, a network monitoring service, or an event log.

21. A network computer for managing data in a file system over a network, comprising:
    a memory that stores at least instructions; and
    one or more processors that execute instructions that are configured to cause performance of actions, including:
        executing a plurality of file system operations in the file system based on one or more of a file system client action or a file system administrative action, wherein the file system is integrated with a network infrastructure that includes a plurality of network devices;
        determining one or more characteristics of the plurality network devices in the network infrastructure that are associated with the file system based on one or more discovery operations;
        generating one or more interactive user interfaces for one or more users to select one or more of a test template, a test instruction or a test criteria, wherein the one or more interactive user interfaces employ geolocation information for generation of one or more localization features that include one or more of a time zone, a natural language, a currency, a calendar format;
        generating one or more tests based on the one or more of the selected test template, the test instruction, the test criteria or the characteristics of the plurality of network devices, wherein the one or more tests are executed to evaluate the plurality of network devices, and wherein execution of the one or more tests causes performance of further actions, including:
            determining one or more test stems associated with one or more target network devices of the plurality of network devices, wherein the one or more test stems include one or more template fields;
            generating one or more candidate tests based on populating the one or more template fields with the one or more characteristics of the one or more target network devices, wherein the one or more characteristics include one or more of a network address, a MAC address, or an application programmer interface (API) parameter; and
            validating the one or more candidate tests based on the one or more target network devices, wherein each invalid candidate test is discarded; and
        employing one or more results of the one or more tests to perform further actions, including:
            determining one or more non-compliant network devices of the plurality of network devices based on the one or more results; and
            modifying the network infrastructure based on the one or more non-compliant network devices, wherein one or more of the plurality of file system operations are modified based on the one or more non-compliant network devices; and
            executing the one or more modified file system operations on the modified network infrastructure.

22. The network computer of claim 21, wherein the one or more processors execute instructions that are configured to cause performance of actions, further comprising:
    determining one or more features of the network infrastructure based on real-time monitoring of network activity in the network infrastructure, wherein the one or more features include one or more of a default gateway, a domain name service server, a cloud endpoint, a file system replication cluster, or a time service; and
    determining one or more characteristics of one or more portions of the network infrastructure based on the one or more features, wherein the one or more portions of the network infrastructure include one or more of a sub-network, a virtual local area network (VLAN), or a path from a network endpoint in the file system to a target network endpoint.

23. The network computer of claim 21, wherein the one or more discovery operations, further comprise:
    executing one or more actions to interrogate the plurality of network devices based on one or more of an application programmer interface (API), a schema, a library, or a protocol; and
    determining the one or more characteristics of the plurality of network devices based on the interrogation, wherein the plurality of network devices include one or more of a network interface, a network switch, a hub, a network bridge, a router, an access point, a load balancer, a modem, a gateway, or a firewall.

24. The network computer of claim 21, wherein the one or more processors execute instructions that are configured to cause performance of actions, further comprising:
    determining one or more untested network devices or one or more untested portions of the network infrastructure that are unassociated with a test based on a comparison of the one or more tests with the plurality of network devices and the network infrastructure; and
    generating one or more other tests based on the one or more untested network devices or the one or more untested portions of the infrastructure, wherein the one or more other tests are executed to evaluate the one or more untested network devices or the one or more untested portions of the infrastructure.

25. The network computer of claim 21, wherein the one or more tests include one or more of a connectivity test, a domain name service (DNS) resolution test, an endpoint reachability test, a replication synchronization test, a quality of service test, a network stability test, a bandwidth test, a latency test, a network packet loss test, or a time synchronization test.

26. The network computer of claim 21, wherein executing the plurality of file system operations, further comprises:
    executing one or more of a file system client request, a file system backup operation, a file system recovery operation, a replication operation, a meta-data update operation, a snapshot operation, a data protection operation, or a rebalancing operation.

* * * * *